United States Patent
Park et al.

(10) Patent No.: US 11,592,711 B2
(45) Date of Patent: Feb. 28, 2023

(54) DISPLAY DEVICE AND LIGHT APPARATUS COMPRISING A REFLECTIVE SHEET HAVING A PLURALITY OF FIRST AND SECOND LIGHT CONVERSION DOTS RESPECTIVELY DISPOSED AROUND FIRST AND SECOND HOLES

(71) Applicant: SAMSUNG ELECTRONICS CO., LTD., Suwon-si (KR)

(72) Inventors: Yoonki Park, Suwon-si (KR);
Hyungjin Kim, Suwon-si (KR);
Yongsung Yoo, Suwon-si (KR);
Youngwook Jung, Suwon-si (KR);
Minnyeong Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/841,165

(22) Filed: Jun. 15, 2022

(65) Prior Publication Data

US 2022/0308400 A1 Sep. 29, 2022

Related U.S. Application Data

(63) Continuation of application No. 17/418,664, filed as application No. PCT/KR2021/002835 on Mar. 8, 2021, now Pat. No. 11,397,352.

(30) Foreign Application Priority Data

Jan. 5, 2021 (KR) ........................ 10-2021-0000892
Feb. 3, 2021 (KR) ........................ 10-2021-0015416

(51) Int. Cl.
*G02F 1/1335* (2006.01)
*G02F 1/13357* (2006.01)
(Continued)

(52) U.S. Cl.
CPC .... *G02F 1/133614* (2021.01); *G02F 1/01791* (2021.01); *G02F 1/133553* (2013.01);
(Continued)

(58) Field of Classification Search
CPC .. G02F 1/01791; G02F 1/13762; G02F 1/353; G02F 2202/046
See application file for complete search history.

(56) References Cited

U.S. PATENT DOCUMENTS

2015/0009453 A1 1/2015 Cha et al.
2016/0041325 A1 2/2016 Kim et al.
(Continued)

FOREIGN PATENT DOCUMENTS

JP 6119490 B2 4/2017
JP 2017-152475 A 8/2017
(Continued)

OTHER PUBLICATIONS

Communication dated Feb. 22, 2022, issued by the European Patent Office in counterpart European Application No. 21194730.4.
(Continued)

*Primary Examiner* — Paul C Lee
(74) *Attorney, Agent, or Firm* — Sughrue Mion, PLLC

(57) ABSTRACT

A display apparatus includes a liquid crystal panel; light sources configured to emit blue light; a reflective sheet including four edge portions and a first hole and a second hole on each of the four edge portions of the reflective sheet, the first hole disposed at a first distance from an edge of the reflective sheet, and the second hole disposed at a second distance from the edge of the reflective sheet, wherein the second distance is greater than the first distance; and first and second light conversion dots, wherein the first light conversion dots are disposed around the first hole of the reflective sheet, and the second light conversion dots are disposed
(Continued)

around the second hole of the reflective sheet, wherein a size of each of the first light conversion dots is greater than a size of each of the second light conversion dots.

20 Claims, 22 Drawing Sheets

(51) Int. Cl.
*G02F 1/017* (2006.01)
*G02F 1/35* (2006.01)
*G02F 1/137* (2006.01)

(52) U.S. Cl.
CPC .. *G02F 1/133605* (2013.01); *G02F 1/133617* (2013.01); *G02F 1/13762* (2013.01); *G02F 1/353* (2013.01); *G02F 2202/046* (2013.01); *G02F 2202/36* (2013.01)

(56) References Cited

U.S. PATENT DOCUMENTS

| | | |
|---|---|---|
| 2018/0080625 A1 | 3/2018 | Yamada et al. |
| 2018/0156966 A1* | 6/2018 | Cho ................. G02F 1/133615 |
| 2018/0160573 A1* | 6/2018 | Kim ................. G02F 1/133385 |
| 2018/0164639 A1 | 6/2018 | Oh et al. |
| 2018/0341151 A1* | 11/2018 | Kurita ............... G02F 1/133608 |
| 2019/0049762 A1 | 2/2019 | Yonemoto et al. |
| 2019/0293970 A1 | 9/2019 | Kim et al. |
| 2019/0324323 A1 | 10/2019 | Oh et al. |
| 2020/0050046 A1 | 2/2020 | Park et al. |
| 2020/0064690 A1 | 2/2020 | Xu et al. |
| 2020/0133075 A1 | 4/2020 | Jeon et al. |
| 2020/0150491 A1* | 5/2020 | Jang ................. G02F 1/133605 |
| 2020/0371397 A1 | 11/2020 | An et al. |
| 2021/0026203 A1 | 1/2021 | Kim et al. |
| 2021/0149251 A1 | 5/2021 | Lee et al. |
| 2021/0263379 A1 | 8/2021 | Lee et al. |
| 2021/0302785 A1 | 9/2021 | Nam et al. |
| 2021/0359157 A1 | 11/2021 | Hu |

FOREIGN PATENT DOCUMENTS

| | | |
|---|---|---|
| JP | 2018-181811 A | 11/2018 |
| JP | 2019-139906 A | 8/2019 |
| KR | 10-2011-0064656 A | 6/2011 |
| KR | 10-1177480 B1 | 8/2012 |
| KR | 10-1572165 B1 | 11/2015 |
| KR | 10-2016-0016020 A | 2/2016 |
| KR | 10-2016-0051569 A | 5/2016 |
| KR | 10-2016-0051570 A | 5/2016 |
| KR | 10-2016-0076346 A | 6/2016 |
| KR | 10-2016-0141302 A | 12/2016 |
| KR | 10-2020523 B1 | 9/2019 |
| KR | 10-2094829 B1 | 3/2020 |
| KR | 10-2161206 B1 | 9/2020 |
| KR | 10-2185701 B1 | 12/2020 |
| KR | 10-2252237 B1 | 5/2021 |

OTHER PUBLICATIONS

Communication dated Jan. 26, 2022, issued by the Korean Intellectual Property Office in Korean Patent Application No. 10-2021-0015416.
Communication dated Jun. 3, 2022, issued by the Korean Intellectual Property Office in Korean Patent Application No. 10-2021-0015416.
Communication dated Jan. 10, 2022 by the United States Patent Office in U.S. Appl. No. 17/473,128.
Communication dated Mar. 4, 2022 by the European Patent Office in European Patent Application No. 21194730.4.
Communication dated Nov. 22, 2021 by the United States Patent Office in U.S. Appl. No. 17/463,932.
Communication dated Nov. 9, 2021 by the United States Patent Office in U.S. Appl. No. 17/463,932.
Communication dated Oct. 17, 2021 by the Korean Intellectual Property Office in Korean Patent Application No. 10-2021-0015416.
Search Report (PCT/ISA/210) dated Nov. 3, 2021 by the International Searching Authority in International Application No. PCT/KR2021/002835.

* cited by examiner

DISPLAY DEVICE AND LIGHT APPARATUS COMPRISING A REFLECTIVE SHEET HAVING A PLURALITY OF FIRST AND SECOND LIGHT CONVERSION DOTS RESPECTIVELY DISPOSED AROUND FIRST AND SECOND HOLES

CROSS-REFERENCE TO RELATED APPLICATIONS

This application a continuation of U.S. application Ser. No. 17/418,664, filed on Jun. 25, 2021, which is a national stage application of International Application No. PCT/KR2021/002835 filed on Mar. 8, 2021, which claims priority from Korean Patent Application No. 10-2021-0000892, filed on Jan. 5, 2021 and Korean Patent Application No. 10-2021-0015416, filed on Feb. 3, 2021, in the Korean Intellectual Property Office, the disclosures of which are incorporated herein by reference in their entireties.

BACKGROUND

1. Field

The present disclosure relates to a display apparatus and more particularly, to a display apparatus having a thin thickness, and a light source module thereof.

2. Description of Related Art

Generally, a display apparatus converts obtained or stored electrical information into visual information and displays the visual information to a user. The display apparatus is used in various fields such as home or workplace.

The display apparatus includes a monitor apparatus connected to a personal computer or a server computer, a portable computer device, a navigation terminal device, a general television apparatus, an Internet Protocol television (IPTV), a portable terminal device, such as a smart phone, a tablet PC, a personal digital assistant (PDA) or a cellular phone, various display apparatuses used to reproduce images, such as advertisements or movies in an industrial field, or various kinds of audio/video systems.

The display apparatus includes a light source module configured to convert electrical information into visual information, and the light source module includes a plurality of light sources configured to independently emit light. Each of the plurality of light sources includes, for example, a light emitting diode (LED) or an organic light emitting diode (OLED). For example, the LED or the OLED may be mounted on a circuit board or a substrate.

Recently, display apparatuses have become thinner and thinner. In order to provide a thin display apparatus, a light source module must also become thinner. Because a thickness of the light source module is reduced, a light source may be miniaturized and the number of light sources disposed in the light source module may be increased. The miniaturization of the light source and the increase in the number of light sources may cause optical defects (for example, unevenness) of the light source module.

SUMMARY

The present disclosure is directed to providing a display apparatus capable of preventing or suppressing an optical defect (for example, unevenness).

One aspect of the present disclosure provides a display apparatus including: a liquid crystal panel; a plurality of light sources configured to emit blue light; a reflective sheet including four edge portions and a center portion, wherein a plurality of holes are disposed on the reflective sheet, the plurality of holes includes a first hole and a second hole on each of the four edge portions of the reflective sheet, each of the four edge portions includes an edge of the reflective sheet, the first hole is disposed at a first distance from the edge of the reflective sheet, and the second hole is disposed at a second distance from the edge of the reflective sheet, wherein the second distance is greater than the first distance; and a plurality of light conversion dots including a plurality of first light conversion dots and a plurality of second light conversion dots, wherein the plurality of first light conversion dots are disposed around the first hole of the reflective sheet, and the plurality of second light conversion dots are disposed around the second hole of the reflective sheet, wherein a size of each of the plurality of first light conversion dots is greater than a size of each of the plurality of second light conversion dots, and wherein the plurality of holes further includes other holes disposed on the center portion, no light conversion dot is disposed around each of the other holes.

Another aspect of the present disclosure provides a display apparatus including: a reflective sheet including four edge portions and a center portion, wherein a plurality of holes are disposed on the reflective sheet, the plurality of holes includes a first hole and a second hole on each of the four edge portions of the reflective sheet, each of the four edge portions includes an edge of the reflective sheet, the first hole is disposed at a first distance from the edge of the reflective sheet, and the second hole is disposed at a second distance from the edge of the reflective sheet, wherein the second distance is greater than the first distance; and a plurality of light conversion dots including a plurality of first light conversion dots and a plurality of second light conversion dots, wherein the plurality of first light conversion dots are disposed around the first hole of the reflective sheet, and the plurality of second light conversion dots are disposed around the second hole of the reflective sheet, wherein a size of each of the plurality of first light conversion dots is greater than a size of each of the plurality of second light conversion dots, and wherein the plurality of holes further includes other holes disposed on the center portion, no light conversion dot is disposed around each of the other holes.

A display apparatus according to an aspect of the present disclosure may prevent or suppress an optical defect (for example, unevenness).

DETAILED DESCRIPTION

Figure 1:
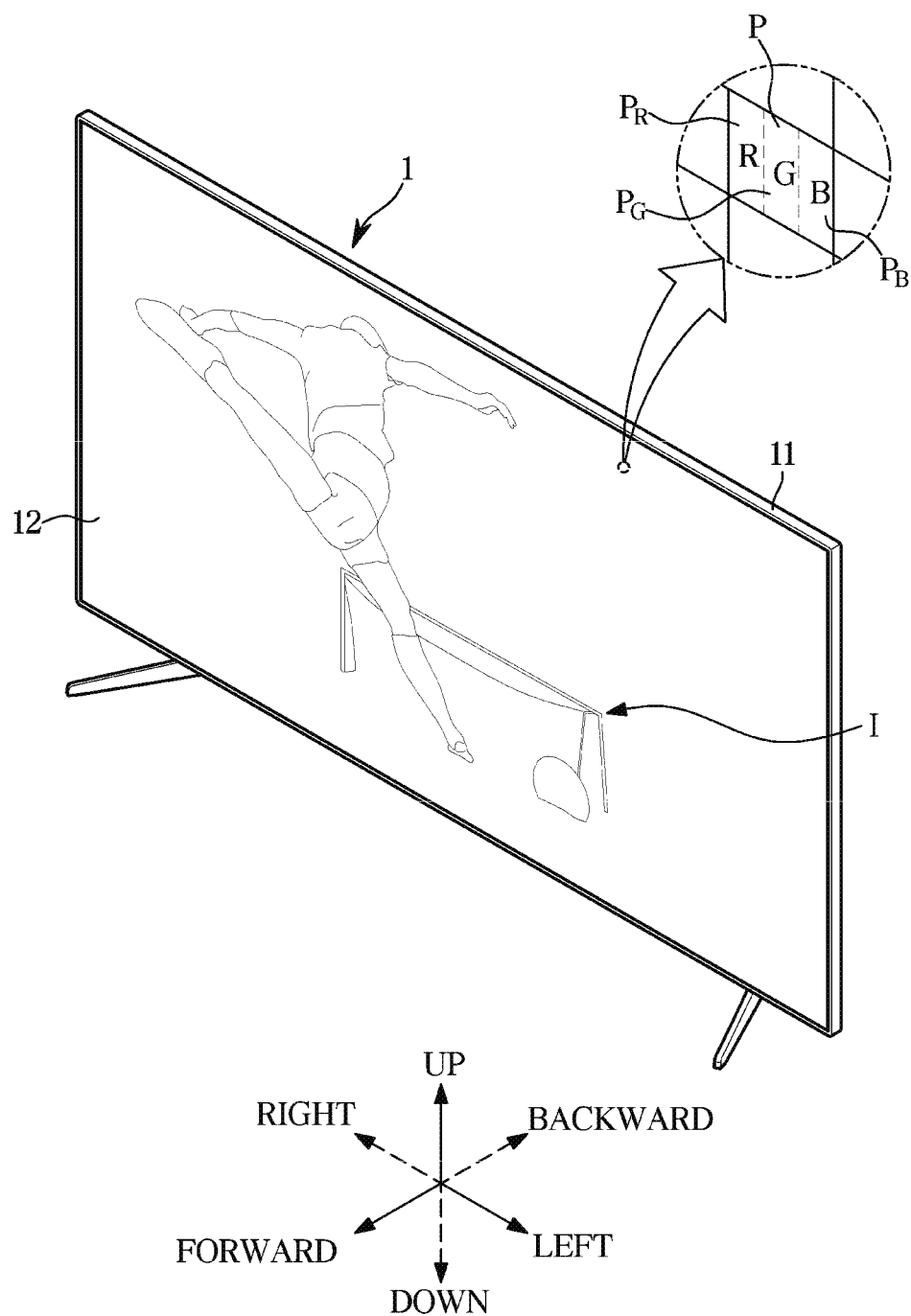
FIG. 1 is a view of an appearance of a display apparatus according to an exemplary embodiment of the present disclosure.

In the following description, like reference numerals refer to like elements throughout the specification. Well-known functions or constructions are not described in detail since they would obscure the one or more exemplary embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" and may also include a plurality of components.

When an element is referred to as being "connected" to another element, it can be directly or indirectly connected to the other element, wherein the indirect connection includes "connection via a wireless communication network".

Also, when a part "includes" or "may include" an element, unless there is a particular description contrary thereto, the part may further include additional elements, not excluding the other elements.

When a first member is "on" a second member, the first member is in contact with the second member, but also includes when there is a third member between the first and second members.

Although the terms first, second, third, etc., may be used herein to describe various elements, is the elements should not be limited by these terms. These terms are only used to distinguish one element from another element.

As used herein, the singular forms "a," "an" and "the" include the plural forms of the words as well, unless the context clearly indicates otherwise.

An identification code is used for the convenience of the description but is not intended to illustrate the order of each step. Each step may be implemented in an order different from the illustrated order unless the context clearly indicates otherwise.

Hereinafter exemplary embodiments of the present disclosure will be described in detail with reference to the accompanying drawings.

FIG. 1 is a view depicting of a display apparatus according to an exemplary embodiment of the disclosure.

A display apparatus 1 is a device that processes an image signal received from an outside source and visually displays the processed image. Hereinafter an exemplary embodiment of a display apparatus 1 that is a television is described, but the present disclosure is not limited thereto. For example, the display apparatus 1 may be implemented in various forms, such as a monitor, a portable multimedia device, and a portable communication device and the display apparatus 1 is not limited in its shape as long as the display apparatus 1 visually displays an image.

The display apparatus 1 may be a large format display (LFD) installed outdoors, such as a roof of a building or a bus stop. The LFD display apparatus 1 is not limited to the outside of a building, and thus the display apparatus 1 according to an exemplary embodiment may be installed in any place where the display apparatus is viewable by a large number of people, including indoors such as in subway stations, shopping malls, movie theaters, companies, and stores.

The display apparatus 1 may receive content data including video data and audio data from various content sources and output video and audio corresponding to the video data and the audio data. For example, the display apparatus 1 may receive content data through a broadcast reception antenna or cable, receive content data from a content playback device, or receive content data from a content provider's content server.

As illustrated in FIG. 1, the display apparatus 1 may include a body 11, and/or a screen 12 configured to display an image I.

The body 11 may form an appearance, e.g., a border, of the display apparatus 1, and the body 11 may include a component configured to allow the display apparatus 1 to display the image I and to perform various functions. Although the body 11 shown in FIG. 1 is in the form of a flat plate, the shape of the body 11 is not limited thereto. For example, the body 11 may have a curved plate shape.

The screen 12 may be formed on a front surface of the body 11, and display the image I. For example, the screen 12 may display a still image or a moving image. Further, the screen 12 may display a two-dimensional plane image or a three-dimensional image to the user using binocular parallax.

For example, the screen 12 may include a self-emission panel (for example, a light emitting diode panel or an organic light emitting diode panel) configured to directly emit light, or a non-self-emission panel (for example, a liquid crystal panel) configured to transmit or block light emitted by a light source apparatus (for example, a backlight unit).

A plurality of pixels P may be formed on the screen 12 and the image I displayed on the screen 12 may be formed by the light emitted from the plurality of pixels P. For example, a single still image may be formed on the screen 12 by combining light emitted from the plurality of pixels P as a mosaic.

Each of the plurality of pixels P may emit different brightness and different color of light. In order to emit light in the various colors, the plurality of pixels P may include sub-pixels $P_R$, $P_G$, and $P_B$.

The sub-pixels may include a red sub pixel $P_R$ emitting red light, a green sub pixel $P_G$ emitting green light, and a blue sub pixel $P_B$ emitting blue light. For example, the red light may represent a light beam having a wavelength of approximately 620 nm (nanometers, one billionth of a meter) to 750 nm, the green light may represent a light beam having a wavelength of approximately 495 nm to 570 nm, and the blue light may represent a light beam having a wavelength of approximately 450 nm to 495 nm.

By combining the red light of the red sub pixel $P_R$, the green light of the green sub pixel $P_G$ and the blue light of the a blue sub pixel $P_B$, each of the plurality of pixels P may emit different brightness and different color of light.

Figure 2:
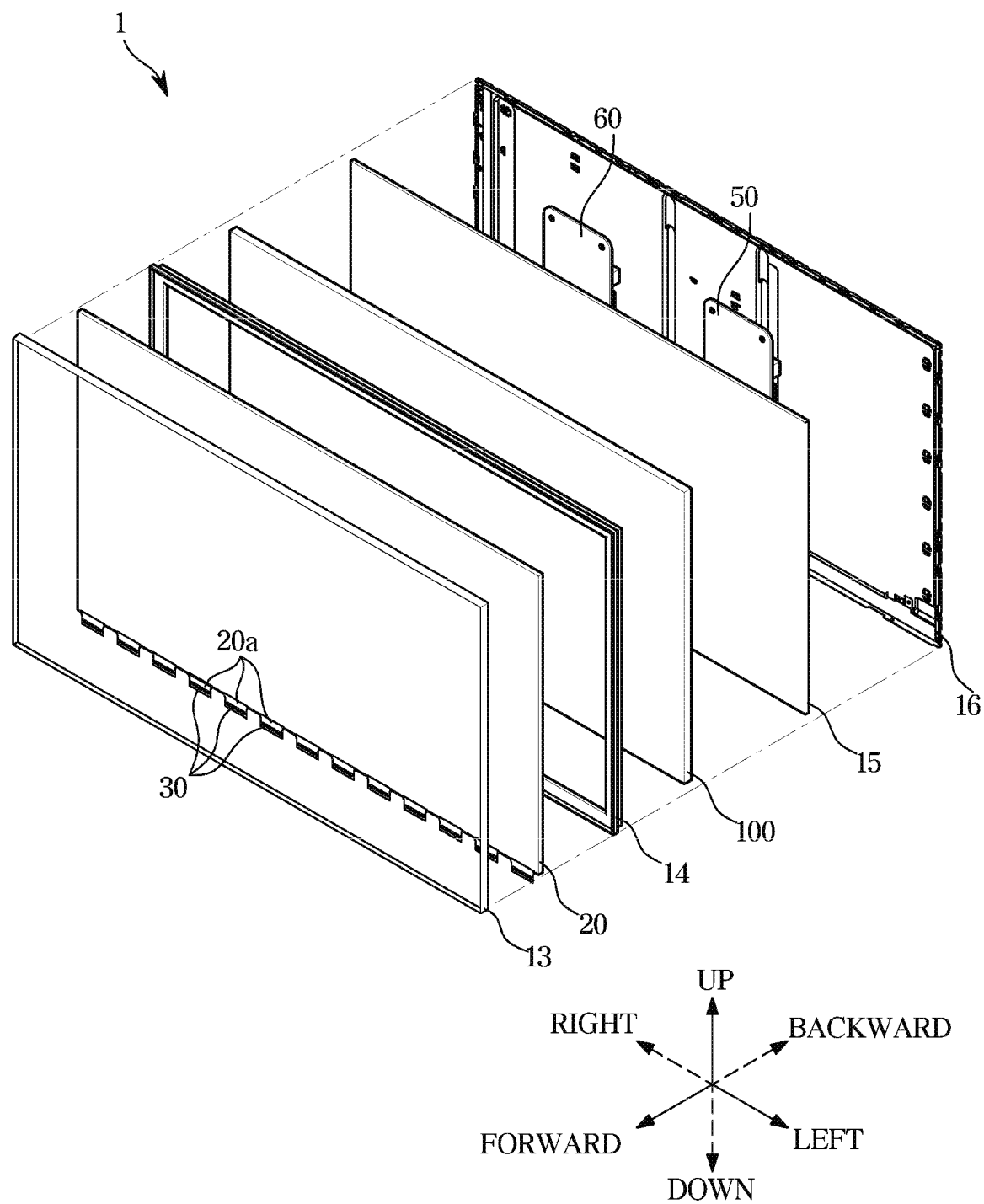
FIG. 2 is an exploded view of the display apparatus according to an exemplary embodiment of the present disclosure.
Figure 3:
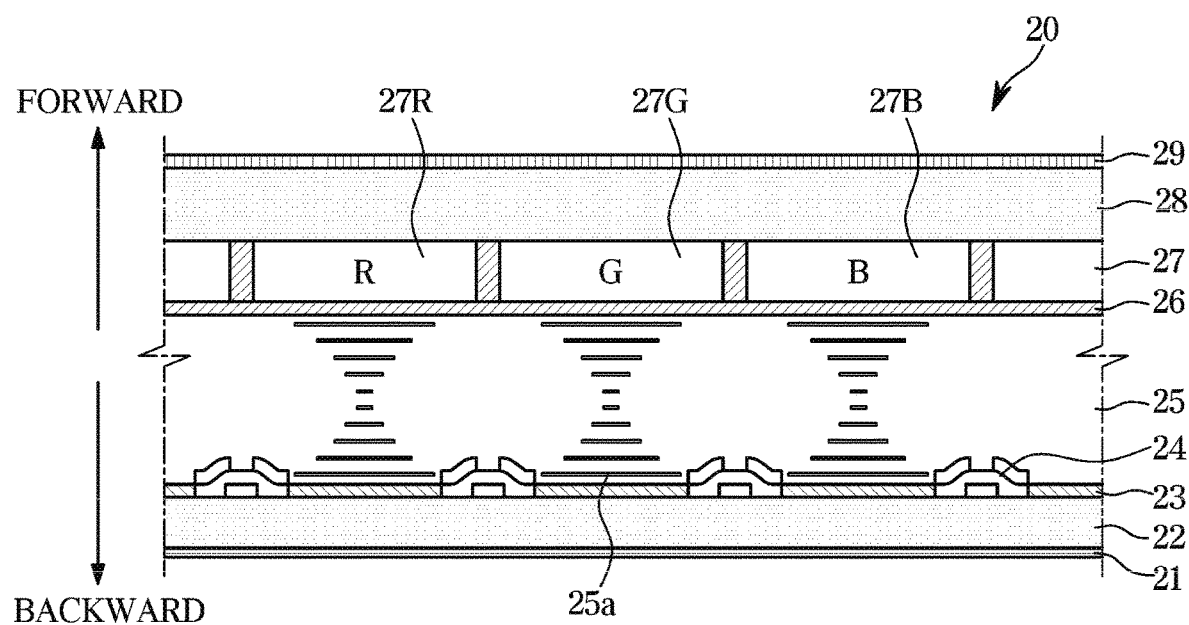
FIG. 3 is a view of a liquid crystal panel of the display apparatus according to an exemplary embodiment of the present disclosure.

FIG. 2 is an exploded view of the display apparatus according to an exemplary embodiment of the present disclosure. FIG. 3 is a view of a liquid crystal panel of the display apparatus according to an exemplary embodiment of the present disclosure.

As shown in FIG. 2, various components configured to generate the image I on the screen 12 may be provided inside the body 11.

For example, the body 11 includes a light source apparatus 100 that is a surface light source, a liquid crystal panel 20 configured to block or transmit light emitted from the light source apparatus 100, a control assembly 50 configured to control an operation of the light source apparatus 100 and the liquid crystal panel 20, and a power assembly 60 configured to supply power to the light source apparatus 100 and the liquid crystal panel 20. Further, the body 11 may include a bezel 13, a frame middle mold 14, a bottom chassis 15, and a rear cover 16 which are configured to support and fix the liquid crystal panel 20, the light source apparatus 100, the control assembly 50, and the power assembly 60.

The light source apparatus 100 may include a point light source configured to emit monochromatic light or white light. The light source apparatus 100 may refract, reflect, and/or scatter light in order to convert light, which is emitted from the point light source, into uniform surface light. As mentioned above, the light source apparatus 100 may refract, reflect, and/or scatter light, which is emitted from the point light source, thereby emitting uniform surface light toward the front.

A configuration of the light source apparatus 100 will be described in more detail below.

The liquid crystal panel 20 is provided in front of the light source apparatus 100 and blocks or transmits light emitted from the light source apparatus 100 to form the image I.

A front surface of the liquid crystal panel 20 may form the screen-12 of the display apparatus 1 described above, and the liquid crystal panel 20 may form the plurality of pixels P. In the liquid crystal panel 20, the plurality of pixels P may independently block or transmit light of the light source apparatus 100, and the light transmitted through the plurality of pixels P may form the image I displayed on the screen 12.

For example, as shown in FIG. 3, the liquid crystal panel 20 may include a first polarizing film 21, a first transparent substrate 22, a pixel electrode 23, a thin film transistor 24, a liquid crystal layer 25, a common electrode 26, a color filter 27, a second transparent substrate 28, and a second polarizing film 29.

The first transparent substrate 22 and/or the second transparent substrate 28 may fixedly support the pixel electrode 23, the thin film transistor 24, the liquid crystal layer 25, the common electrode 26, and/or the color filter 27. The first transparent substrate 22 and/or the second transparent substrate 28 may be formed of tempered glass or transparent resin.

The first polarizing film 21 and/or the second polarizing film 29 are provided on the outside of the first transparent substrate 22 and/or the second transparent substrate 28. Each of the first polarizing film 21 and the second polarizing film 29 may transmit a specific polarized light beam and block (reflect or absorb) other polarized light beams. For example, the first polarizing film 21 transmits polarized light beams in a first direction and blocks (reflect or absorb) other polarized light beams. In addition, the second polarizing film 29 transmits polarized light beams in a second direction and blocks (reflect or absorb) other polarized light beams. In this case, the first direction and the second direction may be perpendicular to each other. Accordingly, the polarized light beam transmitted through the first polarizing film 21 may not pass through the second polarizing film 29.

The color filter 27 may be provided inside the second transparent substrate 28. The color filter 27 may include a red filter 27R transmitting red light, a green filter 27G transmitting green light, and a blue filter 27G transmitting blue light. The red filter 27R, the green filter 27G, and the blue filter 27B may be disposed parallel to each other. A region in which the color filter 27 is formed corresponds to the pixel P described above. A region in which the red filter 27R is formed corresponds to the red sub-pixel $P_R$, a region in which the green filter 27G is formed corresponds to the green sub-pixel $P_G$, and a region in which the blue filter 27B is formed corresponds to the blue sub-pixel $P_B$.

The pixel electrode 23 may be provided inside the first transparent substrate 22, and the common electrode 26 may be provided inside the second transparent substrate 28. The pixel electrode 23 and the common electrode 26 may be formed of a metal material through which electricity is conducted. The pixel electrode 23 and the common electrode 26 may generate an electric field to change the arrangement of liquid crystal molecules 25a forming the liquid crystal layer 25 to be described below.

The thin film transistor (TFT) 24 is provided inside the second transparent substrate 22. The TFT 24 may transmit or block a current flowing through the pixel electrode 23. For example, an electric field may be formed or removed between the pixel electrode 23 and the common electrode 26 in response to turning on (closing) or turning off (opening) the TFT 24.

The liquid crystal layer 25 is formed between the pixel electrode 23 and the common electrode 26. The liquid crystal layer 25 is filled with the liquid crystal molecules 25a. Liquid crystals represent an intermediate state between a solid (crystal) and a liquid. Liquid crystals also exhibit optical properties according to changes in an electric field. For example, in the liquid crystal, the direction of an arrangement of molecules forming the liquid crystal may change according to a change in an electric field. As a result, the optical properties of the liquid crystal layer 25 may vary depending on the presence or absence of an electric field transmitted through the liquid crystal layer 25.

A cable 20a configured to transmit image data to the liquid crystal panel 20, and a display driver integrated circuit (hereinafter referred to as 'panel driver') 30 configured to process digital image data and output an analog image signal are provided at one side of the liquid crystal panel 20.

The cable 20a may electrically connect the control assembly 50 and/or the power assembly 60 to the panel driver 30, and may also electrically connect the panel driver 30 to the liquid crystal panel 20. The cable 20a may include a flexible flat cable or a film cable that is bendable.

The panel driver 30 may receive image data and/or power from the control assembly 50 and/or the power assembly 60 through the cable 20a. The panel driver 30 may transmit the image data and driving current to the liquid crystal panel 20 through the cable 20a.

In addition, the cable 20a and the panel driver 30 may be integrally implemented as a film cable, a chip on film (COF), or a tape carrier package (TCP). In other words, the panel driver 30 may be disposed on the cable 20a. However, the disclosure is not limited thereto, and the panel driver 30 may be disposed on the liquid crystal panel 20.

The control assembly 50 may include a control circuit configured to control an operation of the liquid crystal panel 20 and the light source apparatus 100. For example, the control circuit may process image data received from an external content source, transmit the image data to the liquid crystal panel 20, and transmit dimming data to the light source apparatus 100.

The power assembly 60 may supply power to the light source apparatus 100 to allow the light source apparatus 100 to output surface light and the power assembly 60 may supply power the liquid crystal panel 20 to allow the liquid crystal panel 20 to block or transmit the light of the light source apparatus 100.

The control assembly 50 and the power assembly 60 may be implemented with a printed circuit board and various circuits mounted on the printed circuit board. For example, the power circuit may include a capacitor, a coil, a resistance element, a processor, and a power circuit board on which the capacitor, the coil, the resistance element, and the processor are mounted. Further, the control circuit may include a memory, a processor, and a control circuit board on which the memory and the processor are mounted.

Figure 4:
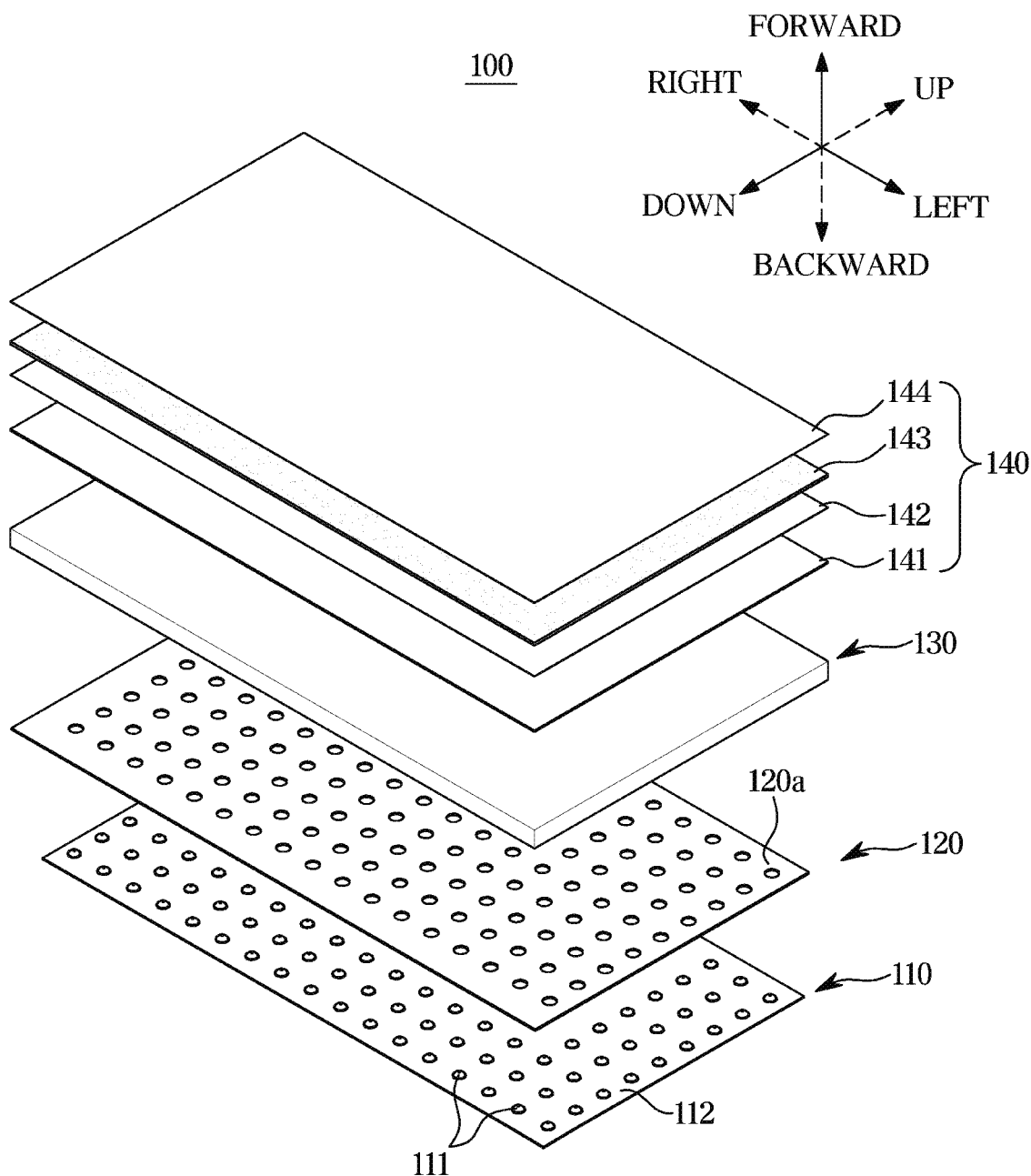
FIG. 4 is an exploded view of a light source apparatus of the display apparatus according to an exemplary embodiment of the present disclosure.
Figure 5:
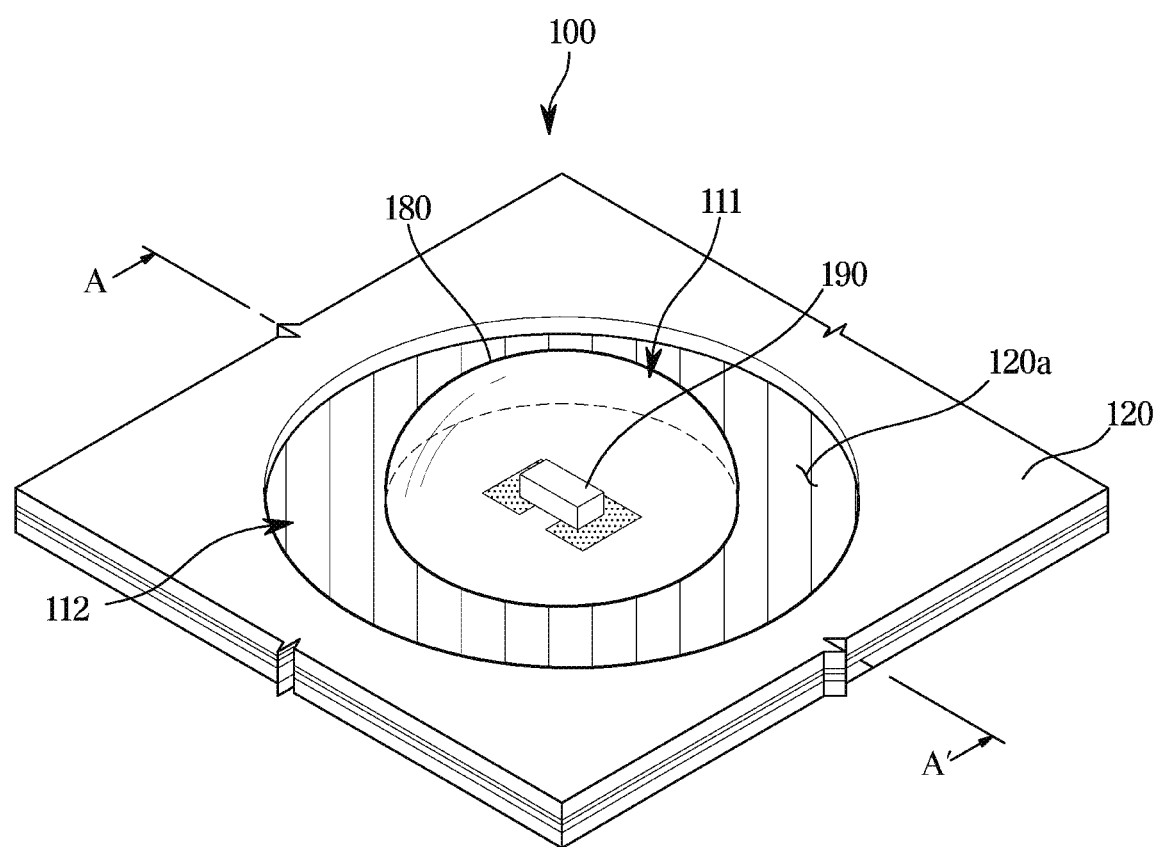
FIG. 5 is a perspective view of a light source included in the light source apparatus according to an exemplary embodiment of the present disclosure.
Figure 6:
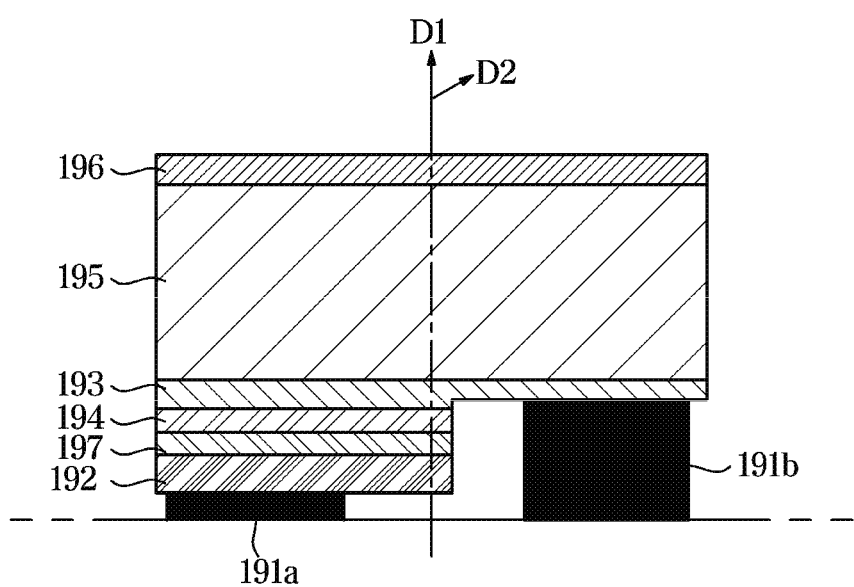
FIG. 6 is a view of an example of a light emitting diode included in the light source apparatus according to an exemplary embodiment of the present disclosure.

FIG. 4 is an exploded view of a light source apparatus of the display apparatus according to an exemplary embodiment of the present disclosure. FIG. 5 is a perspective view of a light source included in the light source apparatus according to an exemplary embodiment of the present disclosure. FIG. 6 is a view of an example of the light emitting diode included in the light source apparatus according to an exemplary embodiment of the present disclosure.

As illustrated in FIG. 4, the light source apparatus 100 may include a light source module 110 configured to generate light, a reflective sheet 120 configured to reflect light, a diffuser plate 130 configured to uniformly diffuse light, and an optical sheet 140 configured to improve luminance of light that is emitted.

The light source module 110 may include a plurality of light sources 111 configured to emit light, and a substrate 112 configured to support/fix the plurality of light sources 111.

The plurality of light sources 111 may be arranged in a predetermined pattern to allow light to be emitted with uniform luminance. The plurality of light sources 111 may be arranged in such a way that a distance between one light source and light sources adjacent thereto is the same.

For example, as shown in FIG. 4, the plurality of light sources 111 may be arranged in rows and columns. Accordingly, the plurality of light sources 111 may be arranged such that an approximately square is formed by four adjacent light sources. In addition, any one light source may be disposed adjacent to four light sources, and a distance between one light source and four adjacent light sources may be approximately the same.

Alternatively, the plurality of light sources may be disposed in a plurality of rows, and a light source belonging to each row may be disposed at the center of two light sources belonging to an adjacent row. Accordingly, the plurality of light sources may be arranged such that an approximately equilateral triangle is formed by three adjacent light sources. In this case, one light source may be disposed adjacent to six light sources, and a distance between one light source and six adjacent light sources may be approximately the same.

However, the pattern in which the plurality of light sources 111 is disposed is not limited to the pattern described above, and the plurality of light sources 111 may be disposed in various patterns to allow light to be emitted with uniform luminance.

The light source 111 may employ an element configured to emit monochromatic light (light of a specific wavelength or light of a single peak wavelength, for example, blue light) or white light (light of a plurality of peak wavelengths, for example, light of a mixture of red light, green light, and blue light) in various directions by receiving power.

Each of the plurality of light source 111 may include a light emitting diode (LED) 190, and an optical dome 180.

To reduce a thickness of the display apparatus 1, a thickness of the optical device 100 may be reduced. A thickness of each of the plurality of light sources 111 is reduced to allow the thickness of the optical device 100 to be reduced resulting in a simplified structure.

The LED 190 may be directly attached to the substrate 112 in a Chip On Board (COB) method. In other words, the light source 111 may include the LED 190 where a light emitting diode chip or a light emitting diode die is directly attached to the substrate 112 without an additional package.

The LED 190 may be manufactured in the flip chip type. As for the flip-chip type LED 190, when attaching the light emitting diode corresponding to a semiconductor device to the substrate 112, an intermediate medium, such as a metal lead (wire) or a ball grid array (BGA) may not be used. Instead, an electrode pattern of the semiconductor device may be fused to the substrate 112 as it is. Accordingly, because the metal lead (wire) or the ball grid array is omitted, the light source 111 including the flip-chip type LED 190 may be miniaturized.

For example, the LED 190 may be a Distributed Bragg Reflector (DBR) based LED including a DBR, as shown in FIG. 6.

The LED 190 may include a transparent substrate 195, an n-type semiconductor layer 193 (for example, n-type GaN, or n-type gallium nitride) and a p-type semiconductor layer 192 (for example, p-type GaN, or p-type gallium nitride). Between the n-type semiconductor layer 193 and the p-type semiconductor layer 192, a multi-quantum well (MQW) layer 194 and an electron-blocking layer (EBL) 197 are formed. In response to a current being supplied to the LED 190, electrons and holes are recombined in the MQW layer 194 and thus light may be emitted.

A first electrode 191a of the LED 190 is in electrical contact with the p-type semiconductor layer 192, and a second electrode 191b is in electrical contact with the n-type semiconductor layer 193. The first electrode 191a and the second electrode 191b may function not only as electrodes, but also as reflectors configured to reflect light.

A DBR layer 196 is provided on the outside of the transparent substrate 195. The DBR layer 196 may be formed by laminating a material having a different refractive index, and the DBR layer 196 may reflect incident light. Because the DBR layer 196 is provided outside the transparent substrate 195 (an upper side in the drawing), light perpendicularly incident on the DBR layer 196 may be reflected by the DBR layer 196. Therefore, an intensity of light, which is emitted in a direction perpendicular to the DBR layer 196 (an upward direction of the light emitting diode in the drawing) D1, is less than an intensity of light, which is emitted in a direction inclined with respect to the DBR layer 196 (for example, a direction inclined by approximately 60 degrees from the upward direction in the drawing) D2. In other words, the LED 190 may emit stronger light in a lateral direction than in a vertical direction.

In the above description, the flip-chip type LED 190 directly fused on the substrate 112 in the COB method has been described, but the light source 111 is not limited to the flip-chip type LED 190. For example, the light source 111 may include a package type LED.

The optical dome 180 may cover the LED 190. The optical dome 180 may prevent or suppress damages to the LED 190 caused by an external mechanical action and/or damage to the LED 190 caused by to a chemical action.

The optical dome 180 may have a dome shape formed in such a way that a sphere is cut into a surface not including the center thereof, or may have a hemispherical shape in such a way that a sphere is cut into a surface including the center thereof. A vertical cross section of the optical dome 180 may be a bow shape or a semicircle shape.

The optical dome 180 may be formed of silicone or epoxy resin. For example, the molten silicon or epoxy resin may be discharged onto the LED 190 through a nozzle, and the discharged silicon or epoxy resin may be cured, thereby forming the optical dome 180.

Accordingly, the shape of the optical dome 180 may vary depending on the viscosity of the liquid silicone or epoxy resin. For example, the optical dome 180 is manufactured using silicon having a thixotropic index of about 2.7 to 3.3 (appropriately, 3.0). Additionally, the optical dome 180 may be formed with a dome ratio indicating a ratio of a height of a dome with respect to a diameter of a base of the dome (the height of the dome/the diameter of the base) of approximately 0.25 to 0.31 (appropriately 0.28). For example, the optical dome 180 formed of silicon having a thixotropic index of approximately 2.7 to 3.3 (appropriately 3.0) may have a diameter of approximately 2.5 mm (millimeter; $\frac{1}{1,000}$ meter). The diameter of the optical dome 180 may have an error margin of approximately ±20%, and may be between approximately 2.0 mm and 3.0 mm. The height of the optical dome 180 may of approximately 0.7 mm. The height of the optical dome 180 may have an error margin of approximately ±20% and may be between approximately 0.5 mm and 0.9 mm.

However, the diameter (or size) of the optical dome 180 is not limited thereto and thus the diameter (or size) of the optical dome 180 may be approximately several hundred μm (micrometers; $\frac{1}{1,000,000}$ meter) to several tens of mm.

The optical dome 180 may be optically transparent or translucent. Light emitted from the LED 190 may pass through the optical dome 180 and be emitted to the outside.

In this case, the dome-shaped optical dome 180 may refract light like a lens. For example, light emitted from the LED 190 may be refracted by the optical dome 180 and thus may be dispersed.

As mentioned above, the optical dome 180 may protect the LED 190 from external mechanical and/or chemical or electrical actions, as well as dispersing light emitted from the LED 190.

In the above description, the optical dome 180 in the form of a silicon dome has been described, but the light source 111 is not limited to including the optical dome 180. For example, the light source 111 may include a lens for dispersing light emitted from the LED.

The substrate 112 may fix the plurality of light sources 111 to prevent a change in the position of the light source 111. Further, the substrate 112 may supply power, which is for the light source 111 to emit light, to the light source 111.

The substrate 112 may support/fix the plurality of light sources 111 and may be configured with a synthetic resin, tempered glass, or a printed circuit board (PCB) on which a conductive power supply line for supplying power to the light source 111 is formed.

The reflective sheet 120 may reflect light emitted from the plurality of light sources 111 forward or in a direction close to the front.

In the reflective sheet 120, a plurality of through holes 120a is formed at positions corresponding to each of the plurality of light sources 111 of the light source module 110. In addition, the light source 111 of the light source module 110 may pass through the through hole 120a and protrude to the front of the reflective sheet 120. Accordingly, the plurality of light sources 111 may emit light in front of the reflective sheet 120. The reflective sheet 120 may reflect light, which is emitted toward the reflective sheet 120 from the plurality of light sources 111, to the diffuser plate 130.

A size and arrangement of the through-holes 120a may depend on a size and arrangement of the light source 111. For example, based on a diameter of the light source 111 being approximately 2.5 mm, a diameter of the through holes 120a may be appropriately 4.5 mm. The diameter of the through holes 120a may have an error margin of approximately ±20%, and may be between approximately 3.5 mm and 5.5 mm. In addition, a distance between the centers of the through holes 120a may be appropriately 11 mm. The distance between the centers of the through holes 120a may have an error margin of approximately ±20%, and may be between approximately 8.5 mm and 13.5 mm.

The diffuser plate 130 may be provided in front of the light source module 110 and/or the reflective sheet 120 and may evenly distribute the light emitted from the light source 111 of the light source module 110.

As described above, the plurality of light sources 111 is located at equal intervals on the rear surface of the light source apparatus 100. Accordingly, unevenness in luminance may occur according to the positions of the plurality of light sources 111.

The diffuser plate 130 may diffuse light emitted from the plurality of light sources 111 within the diffuser plate 130 in order to remove unevenness in luminance caused by the plurality of light sources 111. In other words, the diffuser plate 130 may uniformly emit uneven light of the plurality of light sources 111 to the front surface.

The optical sheet 140 may include various sheets for improving luminance and uniformity of luminance. For example, the optical sheet 140 may include a light conversion sheet 141, a diffusion sheet 142, a prism sheet 143, and a reflective polarizing sheet 144.

The light conversion sheet 141 may convert a wavelength of a portion of incident light. For example, the light conversion sheet 141 may include a quantum dot (QD) material or a fluorescent material. Depending on the constituent material, the light conversion sheet 141 may be referred to as a fluorescent sheet or a quantum dot sheet.

Quantum dots are nanometers (nm; $1/1,000,000,000$ meter) of small sphere-shaped semiconductor particles, and the quantum dot includes about 2 nanometers [nm] to 10 [nm] of a core and a shell formed of zinc sulfide (ZnS). The core of the quantum dot may be formed of cadmium selenite (CdSe), cadmium telluride (CdTe), or cadmium sulfide (CdS).

The quantum dot emits a particular wavelength of light when an electric field is applied or when absorbing high energy light. In this case, the wavelength of the emitted light may depend on the size of the quantum dot. The smaller quantum dot may emit the shorter wavelength of light, and the larger quantum dot may emit the longer wavelength of light. For example, a quantum dot having a diameter of approximately 2 nm may emit approximately blue light, a quantum dot having a diameter of approximately 3 nm may emit approximately green light, and a quantum dot having a diameter of approximately 6 nm may emit approximately red light.

A material in which the quantum dot having the diameter of approximately 3 nm and the quantum dot having the diameter of approximately 6 nm are mixed may absorb blue light or ultraviolet light and emit green light and/or red light. For example, when blue light or ultraviolet light is incident on the light conversion sheet 141 on which a quantum dot having the diameter of approximately 3 nm and a quantum dot having the diameter of approximately 6 nm are mixed, a portion of blue light or ultraviolet light may be converted into green light and/or red light, and another portion of the light may pass through the light conversion sheet 141. As a result, white light in which blue light, green light, and/or red light are mixed may be emitted from the light conversion sheet 141.

The fluorescent material may convert blue light into yellow light or orange light, or convert blue light into red light and/or green light.

The light conversion sheet 141 may include a yellow (YAG) phosphor that converts blue light to yellow light or orange light, or a red/green (RG) phosphor that converts blue light to red light and/or green light. For example, the light conversion sheet 141 may include a K2SiF6 (KSF) phosphor or a K2TiF6 (KTF) phosphor.

The diffusion sheet 142 may diffuse light to improve uniformity of light transmitted through the light conversion sheet 141.

The prism sheet 143 may deflect the light, which passes through the diffusion sheet 142, to be directed to the front of the light source apparatus 100 (for example, a normal direction of a plane defined by the light source apparatus). For example, light may be diffused in the diffusion sheet 142, and the light may be emitted in an oblique direction from the diffusion sheet 142. By using refraction of light, the prism sheet 143 may deflect light in a normal direction of a plane defined by the prism sheet 143.

The reflective polarizing sheet 144 may transmit a portion of the incident light and reflect other portion of the incident light. For example, the reflective polarizing sheet 144 may transmit P-polarized light and reflect S-polarized light. In general, because the polarizing sheet absorbs polarized light, the luminance of the light source apparatus may be lowered. On the other hand, the reflective polarizing sheet 144 reflects polarized light, and thus the reflected light may be recycled in the light source apparatus 100.

The order of lamination of the optical sheet 140 is not limited to that shown in FIG. 4. For example, the optical sheet 140 may be laminated in such a way that the diffusion sheet 142->the optical change sheet 141->the prism sheet 143->the reflective polarizing sheet 144 are sequentially laminated. Alternatively, the diffusion sheet 142->the prism sheet 143->the optical change sheet 141->the reflective polarizing sheet 144 may be sequentially laminated.

In addition, the optical sheet 140 is not limited to the sheet or film illustrated in FIG. 4, and may include more various sheets or films, such as a protective sheet.

Figure 7:
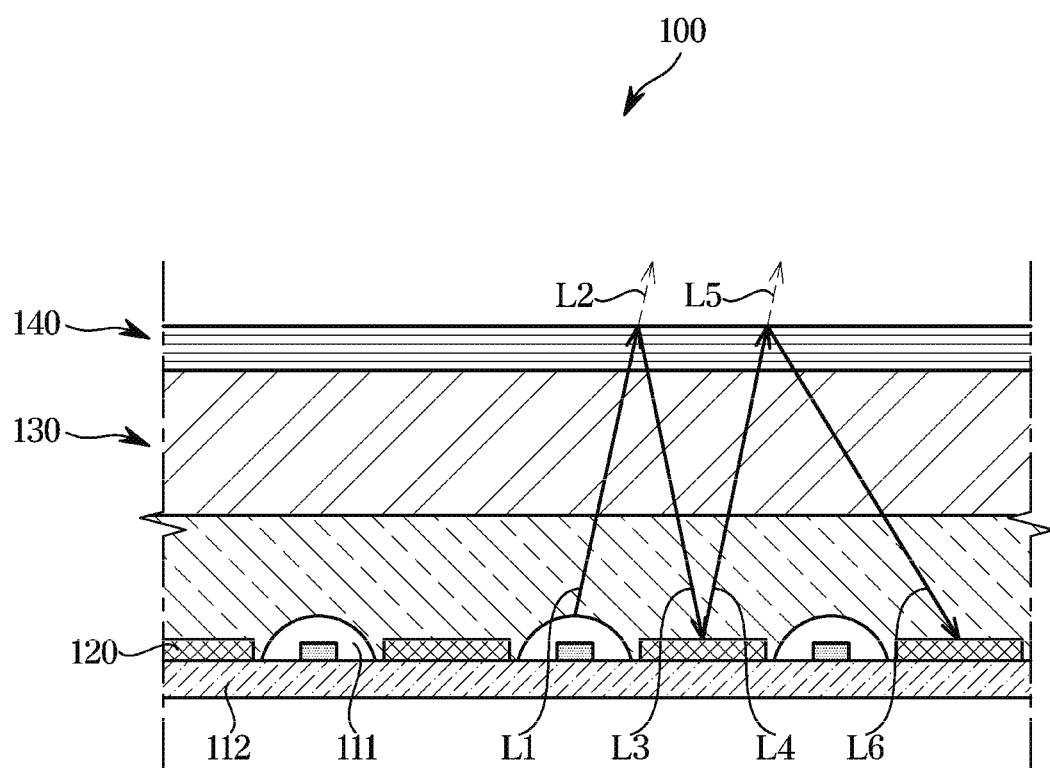
FIG. 7 is a view of a travel path of light in the light source apparatus according to an exemplary embodiment of the present disclosure.
Figure 8:
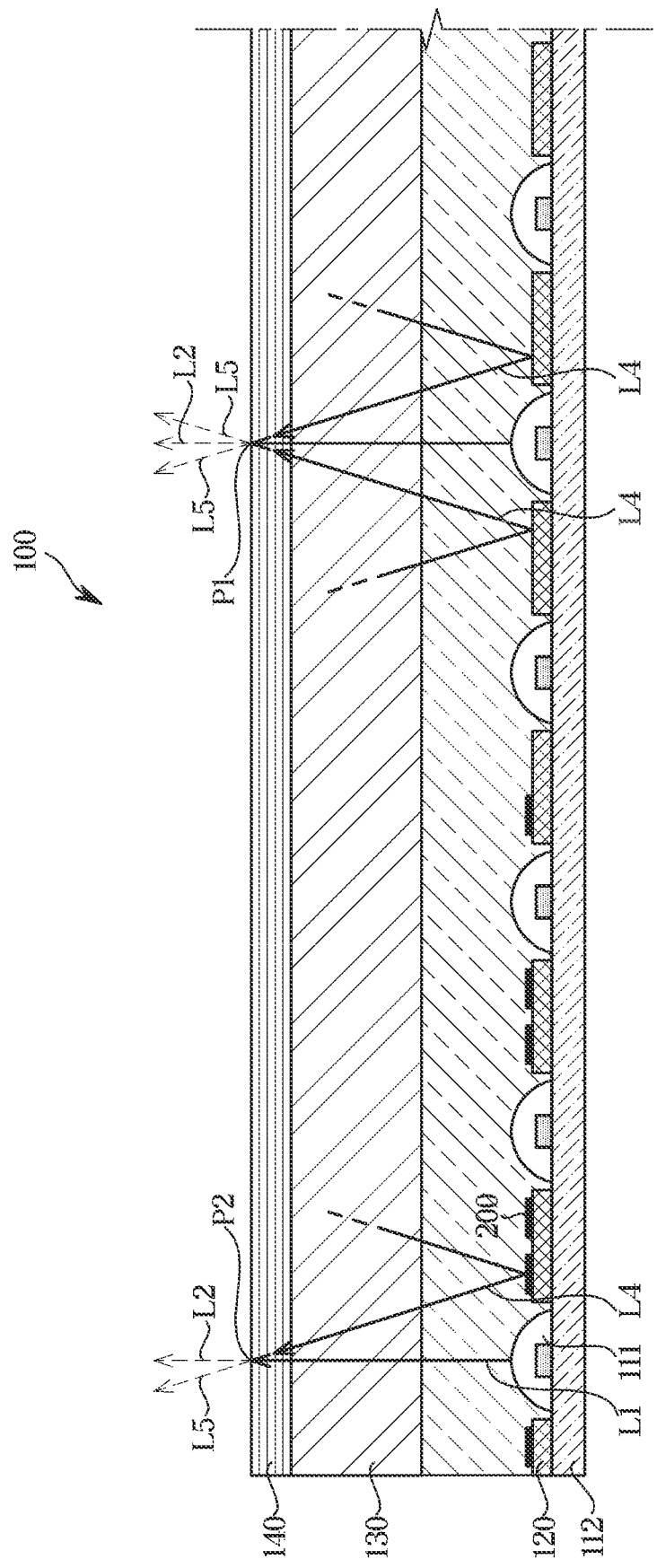
FIG. 8 is a view of a travel path of light at a center portion and an edge portion of the light source apparatus according to an exemplary embodiment of the present disclosure.
Figure 9:
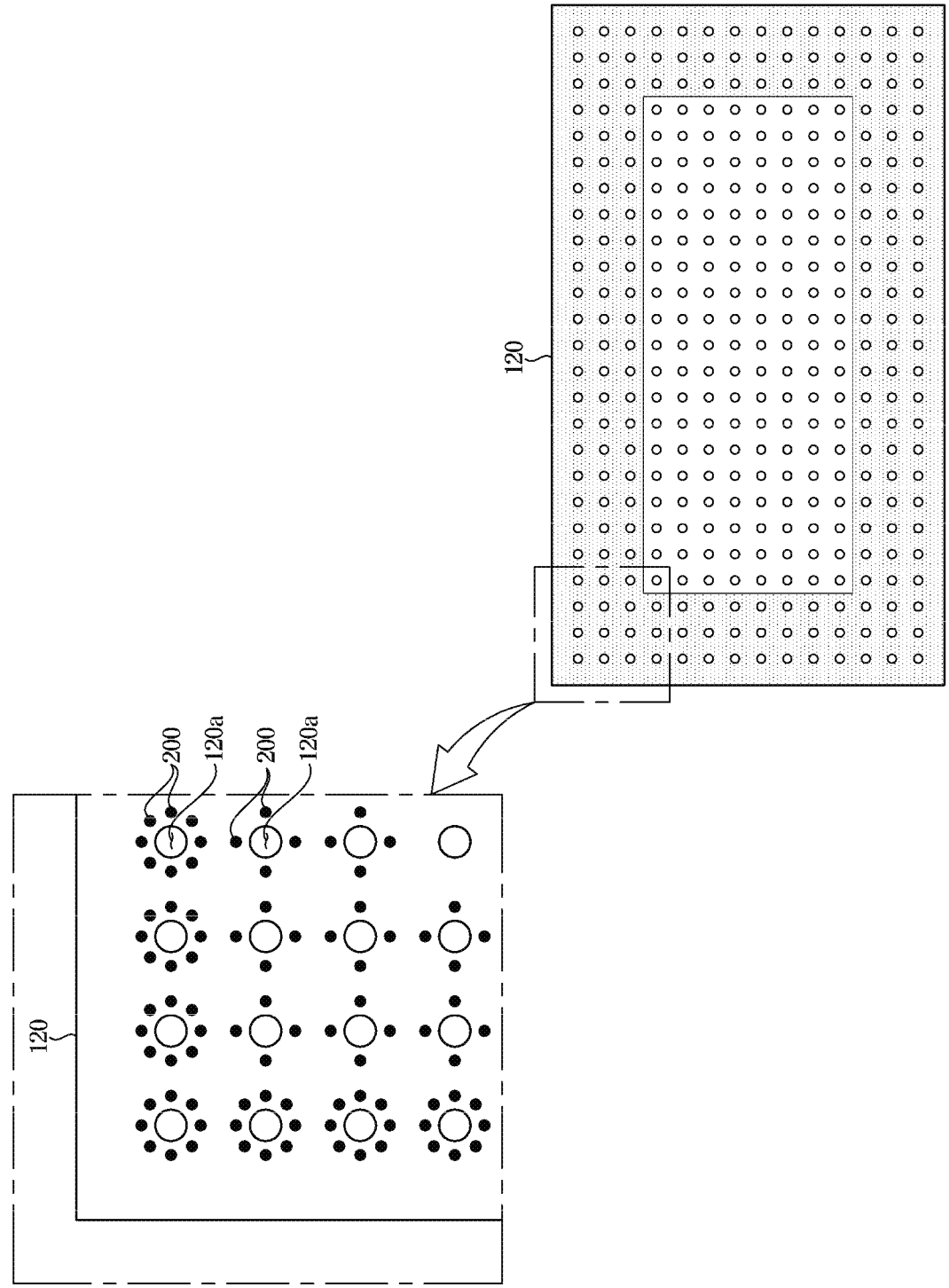
FIG. 9 is a view of a light conversion patch arranged on the edge portion of the light source apparatus according to an exemplary embodiment of the present disclosure.

FIG. 7 is a view of a travel path of light in the light source apparatus according to an exemplary embodiment of the present disclosure. FIG. 8 is a view of a travel path of light at a center portion and an edge portion of the light source apparatus according to an exemplary embodiment of the present disclosure. FIG. 9 is a view of a light conversion patch arranged on the edge portion of the light source apparatus according to an exemplary embodiment of the present disclosure.

Referring to FIGS. 7 and 8, the light source apparatus 100 may include the light source module 110, the reflective sheet 120, the diffuser plate 130, and/or the optical sheet 140.

The light source module 110 includes the plurality of point light sources 111. Light emitted from the plurality of point light sources 111 may be converted into uniform light while being transmitted through the diffuser plate 130 and/or the optical sheet 140.

For example, as shown in FIG. 7, light L1 may be emitted from the light source 111. Light L1 may include blue light having a wavelength of approximately 450 nm and 495 nm.

The light L1 may be transmitted through the diffuser plate 130 and incident on the optical sheet 140. The light L1 may be transmitted through the optical sheet 140 or may be reflected from the optical sheet 140. In addition, although not shown in the drawings, a portion of the light L1 may be absorbed by the diffuser plate 130 and/or the optical sheet 140. The absorbed light may be converted into heat in the diffuser plate 130 and/or the optical sheet 140.

A portion of the light L1, which is light L2, may be transmitted through the optical sheet 140 and then be emitted to the outside of the light source apparatus 100. Particularly, the light L2 emitted from the light source apparatus 100 may be transmitted through the light conversion sheet 141 included in the optical sheet 140. A wavelength of a portion of the light 2 may be changed while being transmitted through the light conversion sheet 141.

For example, a portion of the blue light contained in the light may be transmitted through the light conversion sheet 141, and another portion of the blue light may be changed to red light and/or green light by the light conversion sheet 141. Accordingly, a ratio of blue light of light transmitted through the optical sheet 140 may be reduced, and a ratio of red light and/or green light may be increased.

A portion of the light L1, which is light L3, may be reflected by the optical sheet 140. For example, the light L3 may be reflected by the reflective polarizing sheet 144. Accordingly, a portion of the light may be reflected by the reflective polarizing sheet 144, and thus the light absorbed by the polarizing sheets 21 and 29 of the liquid crystal panel 20 may be reduced, thereby increasing the light recycling efficiency of the display apparatus 1 and thereby improving the luminance of the display apparatus 1.

In addition, the light L3 reflected from the reflective polarizing sheet 144 may be transmitted through the light conversion sheet 141. For example, the light may be transmitted through the light conversion sheet 141 before and after being reflected by the reflective polarizing sheet 144, respectively. Accordingly, the ratio of blue light of the light L3 reflected from the reflective polarizing sheet 144 may be further reduced, and the ratio of red light and/or green light may be further increased.

The light L3 may be moved toward the reflective sheet 120, and reflected by the reflective sheet 120.

Light L4 reflected from the reflective sheet 120 may be again transmitted through the diffuser plate 130 and incident on the optical sheet 140. The light L4 may be transmitted through the optical sheet 140 or may be reflected from the optical sheet 140.

A portion of the light L4, which is light L5, may be transmitted through the optical sheet 140, and emitted to the outside of the light source apparatus 100. The light L5 may be transmitted through the light conversion sheet 141 included in the optical sheet 140. The ratio of blue light of the light L5 transmitted through the light conversion sheet 141 may be further reduced, and the ratio of red light and/or green light may be further increased.

When the light is reflected by the reflective polarizing sheet 144 and the reflective sheet 120, the light may be transmitted through the light conversion sheet 141 several times, and thus the blue light may be converted into the red light and/or the green light. Therefore, the ratio of blue light, in the light L5 having been reflected a large number of times between the reflective polarizing sheet 144 and the reflective sheet 120, may be less than the ratio of blue light in the light 2 having been reflected a small number of times between the reflective polarizing sheet 144 and the reflective sheet 120. In addition, a ratio of red light and/or green light of the light L5 may be greater than a ratio of red light and/or green light of the light L2.

In other words, the light L2 having been reflected a small number of times is bluish in comparison with the light L5 having a large number of times, and the light L5 is yellowish in comparison with the light L2. The light L2 and the light L5 may be mixed with each other and the light source apparatus 100 may emit white light in which the light L2 and the light L5 are mixed. In addition, the white light emitted from the light source apparatus 100 may be incident on the liquid crystal panel 20.

At this time, a mixing ratio of the bluish light L2 and the yellowish light 5 may vary according to a position of the light source apparatus 100.

For example, as shown in FIG. 8, in various positions P1 and P2 of the light source apparatus 100, the bluish light L2 and the yellowish light L5 may be mixed and the mixed light may be emitted from the light source apparatus 100.

Light emitted from a first position P1 of a central portion of the light source apparatus 100 may include the light L2 emitted from the light source 111 (where the number of times transmitted through the light conversion sheet is small), the light L5 reflected by the left reflective sheet 120 (where the number of times transmitted through the light conversion sheet is large), and the light L5 reflected by the right reflective sheet 120 of the light source 111 (where the number of times transmitted through the light conversion sheet is large).

Light emitted from a second position P2 of an edge portion of the light source apparatus 100 may include the light L2 emitted from the light source 111 (where the number of times transmitted through the light conversion sheet is small), and the light L5 reflected by the right reflective sheet 120 of the light source 111 (where the number of times transmitted through the light conversion sheet is large).

Therefore, a ratio of bluish light contained in the light emitted from the first position P1 may be less than a ratio of bluish light contained in the light emitted from the second position P2. In other words, the light emitted from the edge portion of the light source apparatus 100 is more bluish than the light emitted from the central portion of the light source apparatus 100.

A user can relatively easily visually recognize a slight color difference between different locations on the same display apparatus 1. In other words, the edge portion of the light source apparatus 100 is more bluish than the center portion of the light source apparatus 100, that is, an optical defect can be easily recognized by a user.

For example, when a blue (or green) image, such as an image of the sky or an image of a sports game (for example, golf) is displayed across the screen 12, a user can easily recognize the optical defect at the edge portion of the display apparatus 1.

As another example, when a white image is displayed across the screen 12, such as a snowy snow scene image, a user can easily recognize the optical defect at the edge portion of the display apparatus 1 as well.

In order to prevent or suppress the optical defects at the edge portion of the display apparatus 1, a light conversion patch 200 including at least one of a yellow fluorescent material, a red/green fluorescent material, a yellow pigment, a red/green pigment, a yellow dye, a red/green dye, or a red/green quantum dot material may be applied, printed or coated on the edge portion of the light source apparatus 100, as shown in FIG. 9.

For example, on the edge portion of the reflective sheet 120, the light conversion patch 200 may be applied, printed, or coated. The reflective sheet 120 may be divided into a first region representing an edge portion and a second region representing a central portion. The light conversion patch 200 may be applied, printed, or coated on the first region of the reflective sheet 120, and the light conversion patch 200 may not be applied, printed, or coated on the second region of the reflective sheet 120.

As another example, on the edge portion of the substrate 112, the light conversion patch 200 may be applied, printed, or coated. The substrate 112 may be divided into a first region representing an edge portion and a second region representing a central portion. The light conversion patch 200 may be applied, printed, or coated on the first region of the substrate 112, and the light conversion patch 200 may not be applied, printed, or coated on the second region of the substrate 112.

The light conversion patch 200 may absorb a portion of blue light among incident light, and may convert a portion of the absorbed blue light into yellow light, red light, or green light. In addition, the light conversion patch 200 may absorb blue light among incident light and may reflect yellow light, red light, or green light.

Accordingly, the ratio of blue light of the light, which is transmitted through the light conversion patch 200, may be reduced, and the ratio of yellow light, red light, or green light of the light may be increased.

As mentioned above, the light emitted from the second position P2 of the edge portion of the light source apparatus 100 may include the light L2 emitted from the light source 111 (where the number of times transmitted through the light conversion sheet is small), and the light L5 reflected by the right reflective sheet 120 of the light source 111.

The light conversion patch 200 may be applied, printed, or coated on the edge portion of the reflective sheet 120. During the light L5 is reflected from the edge portion of the reflective sheet 120, a portion of blue light included in the light L5 may be converted into yellow light, red light, or green light by the light conversion patch 200. Accordingly, the ratio of blue light in the light L5 may be reduced, and the ratio of yellow light may be increased. In other words, the light L5 may be more yellowish.

Accordingly, the ratio of bluish light included in the light emitted from the second position P2 may be reduced, and the light emitted from the edge portion of the light source apparatus 100 may be less bluish. Further, a difference between the ratio of blue light at the edge portion of the light source apparatus 100 and the ratio of blue light at the center portion of the light source apparatus 100 may be reduced to an extent that the user cannot recognize.

The light conversion patch 200 in the various types or in the various pattern may be applied, printed or coated on the edge portion of the reflective sheet 120 or the edge portion of the substrate 112.

For example, the light conversion patch 200 may be applied, printed or coated on the edge portion of the reflective sheet 120 to surround the through-holes 120a, as shown in FIG. 9.

As mentioned above, the reflective sheet 120 may be divided into the first region representing the edge portion and the second region representing the central portion. In the first region of the reflective sheet 120, a through hole, around which the light conversion patch 200 is applied, printed or coated, may be disposed. In the second region of the reflective sheet 120, a through hole, around which the light conversion patch 200 is not applied, printed or coated, may be disposed.

However, the type or pattern of the light conversion patch 200 as shown in FIG. 9 is only an example of applying, printing or coating the light conversion patch 200, and thus the type or pattern of the light conversion patch 200 is not limited thereto.

The light conversion patch 200 may be applied, printed, or coated to surround the light source 111 on the edge portion of the substrate 112. The light conversion patch 200 arranged on the edge portion of the substrate 112 may be exposed through the through hole 120a.

Hereinafter various types or patterns in which the light conversion patch 200 is applied, printed or coated on the edge portion of the light source apparatus 100 will be described.

Figure 10:
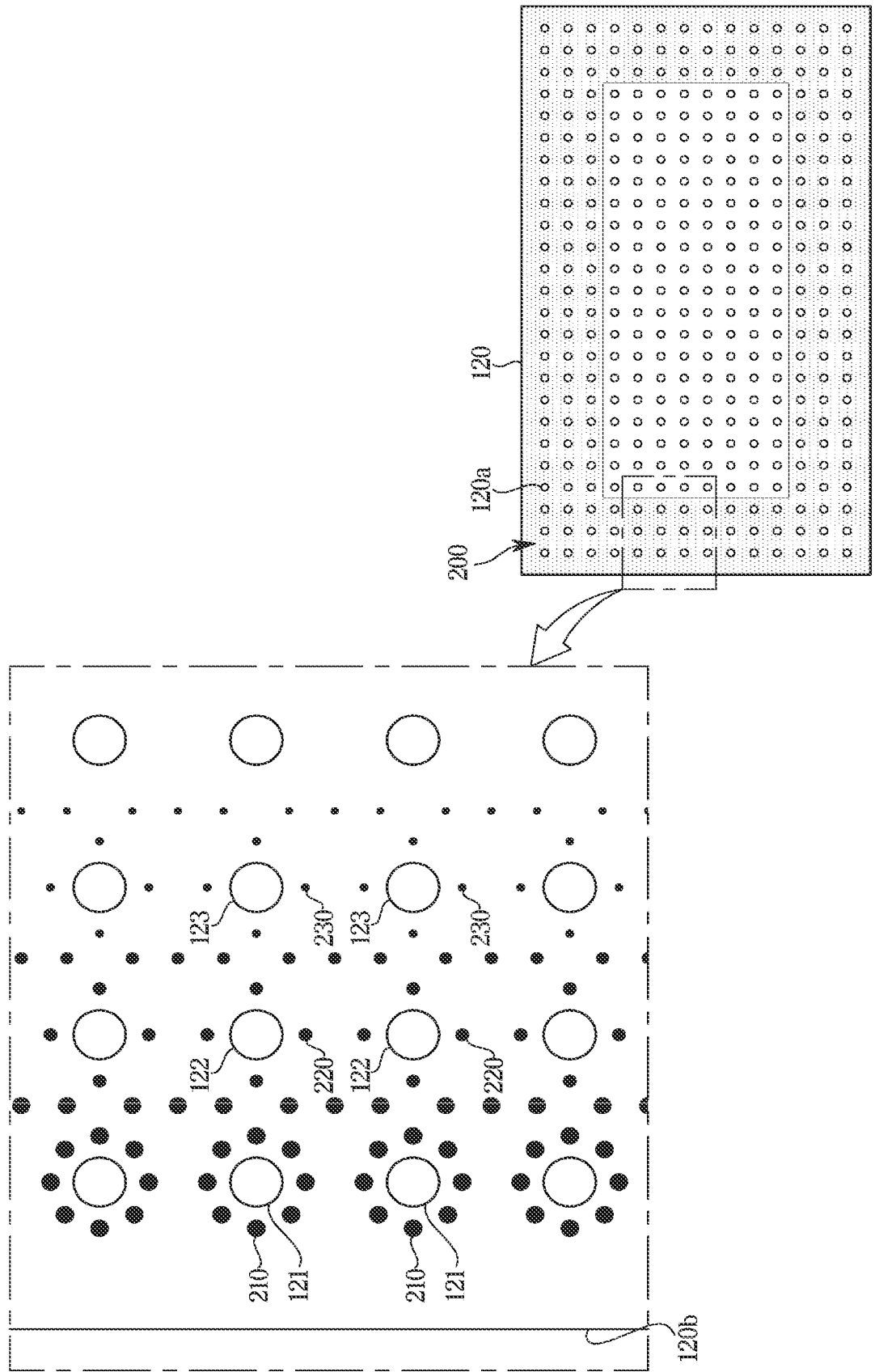
FIG. 10 is a view of an example of an arrangement of the light conversion patch of left and right edge portions of the light source apparatus according to an exemplary embodiment of the present disclosure.

FIG. 10 is a view of an example of an arrangement of the light conversion patch of left and right edge portions of the light source apparatus according to an exemplary embodiment of the present disclosure.

As illustrated in FIG. 10, the through hole 120a, through which the light from the plurality of light sources 111 passes, is formed on the reflective sheet 120. Further, on the edge portion of the reflective sheet 120, the light conversion patch 200 may be applied, printed or coated (hereinafter referred to as "arranged").

The light conversion patch 200 may include a light conversion material that absorbs a portion of blue light among incident light and converts a portion of the absorbed blue light into yellow light, red light, or green light. For example, the light conversion patch 200 may include at least one of a yellow fluorescent material, a red fluorescent material, a green fluorescent material, a red quantum dot material, or a green quantum dot material.

In addition, the light conversion patch 200 may include a light conversion material that absorbs a portion of blue light and reflects yellow light, red light, or green light among incident light. For example, the light conversion patch 200 may include at least one of a yellow pigment, a red pigment, a green pigment, a yellow dye, a red dye, or a green dye.

The light conversion patch 200 may be approximately circular or elliptical. In addition, on the edge portion of the reflective sheet 120, the light conversion patch 200 may be arranged around the through holes 120a to surround the through holes 120a.

The light conversion patch 200 may include a plurality of first light conversion patches 210 arranged around a first through hole 121 disposed in a first column in left and right edges 120b of the reflective sheet 120.

A size and/or number of the first light conversion patch 210 may depend on the arrangement and size of the through-holes 120a. In response to an increase in the distance between the through holes 120a and an increase in the size of the through holes 120a, the size of the first light conversion patches 210 may be increased or the number of first light conversion patches 210 may be increased.

For example, when the distance between the centers of the through-holes 120a is approximately 11.0 mm and the diameter of the through-holes 120a is approximately 4.5 mm, eight first light conversion patches 210 may be arranged around the first through-hole 121. Each of the eight first light conversion patches 210 may have a diameter of approximately 1.0 mm to 2.0 mm. The diameter of each of the first light conversion patches 210 may approximately 1.5 mm, and the diameter thereof may have an error margin of ±20%. In addition, according to an exemplary embodiment, the diameter of each of the first light conversion patches 210 may be approximately 1.3 mm or 1.1 mm.

The plurality of first light conversion patches 210 may be arranged at approximately equal intervals along a circumference of a virtual circle surrounding the first through hole 121. In addition, the plurality of first light conversion patches 210 may be arranged at approximately equal angular intervals with respect to a virtual central point in the first through hole 121. For example, the eight first light conversion patches 210 may be arranged at an angular interval of approximately 45 degrees with respect to the virtual central point in the first through hole 121.

The light conversion patch 200 may include a plurality of second light conversion patches 220 arranged around a second through hole 122 disposed in a second column in the left and right edges 120b of the reflective sheet 120.

A size and/or number of the second light conversion patches 220 may depend on the arrangement and size of the through-holes 120*a*. For example, when the distance between the centers of the through-holes 120*a* is approximately 11.0 mm and the diameter of the through-holes 120*a* is approximately 4.5 mm, four second light conversion patches 220 may be arranged around the second through-hole 122. Each of the four second light conversion patches 220 may have a diameter of approximately 0.8 mm to 1.5 mm. The diameter of each of the second light conversion patches 220 may approximately 1.3 mm, and the diameter thereof may have an error margin of ±20%. In addition, according to an exemplary embodiment, the diameter of each of the second light conversion patches 220 may be approximately 1.2 mm, 1.1 mm, or 0.9 mm.

The plurality of second light conversion patches 220 may be arranged at approximately equal intervals along a circumference of a virtual circle surrounding the second through hole 122. In addition, the plurality of second light conversion patches 220 may be arranged at approximately equal angular intervals with respect to a virtual central point in the second through hole 122. For example, the four second light conversion patches 220 may be arranged at an angular interval of approximately 90 degrees with respect to the virtual central point in the second through hole 122.

The light conversion patch 200 may include a plurality of third light conversion patches 230 arranged around a third through hole 123 disposed in a third column in the left and right edges of the reflective sheet 120.

A size and/or number of the third light conversion patches 230 may depend on the arrangement and size of the through-holes 120*a*. For example, when the distance between the centers of the through-holes 120*a* is approximately 11.0 mm and the diameter of the through-holes 120*a* is approximately 4.5 mm, three third light conversion patches 230 may be arranged around the third through-hole 123. Each of the three third light conversion patches 230 may have a diameter of approximately 0.6 mm to 1.3 mm. The diameter of each of the third light conversion patches 230 may approximately 1.1 mm, and the diameter thereof may have an error margin of ±20%. In addition, according to an exemplary embodiment, the diameter of each of the third light conversion patches 230 may be approximately 0.9 mm or 0.7 mm.

The plurality of third light conversion patches 230 may be arranged at approximately equal intervals along a circumference of a virtual circle surrounding the third through hole 123. For example, the three third light conversion patches 230 may be arranged at an angular interval of approximately 45 degrees or 90 degrees with respect to the virtual central point in the third through hole 123.

The diameters of the first light conversion patches 210, the second light conversion patches 220, and the third light conversion patches 230 may be variously combined. For example, the diameter of the first light conversion patches 210, the second light conversion patches 220, and the third light conversion patches 230 may be approximately 1.5 mm, approximately 1.3 mm, and approximately 1.1 mm, respectively. As another example, the diameter of the first light conversion patches 210, the second light conversion patches 220, and the third light conversion patches 230 may be approximately 1.3 mm, approximately 1.2 mm, and approximately 1.1 mm, respectively. As another example, the diameter of the first light conversion patches 210, the second light conversion patches 220, and the third light conversion patches 230 may be approximately 1.3 mm, approximately 1.1 mm, and approximately 0.9 mm, respectively. As another example, the diameter of the first light conversion patches 210, the second light conversion patches 220, and the third light conversion patches 230 may be approximately 1.1 mm, approximately 0.9 mm, and approximately 0.7 mm, respectively.

The light conversion patch 200 may not be only arranged around the through holes 120*a* of the edge portion of the reflective sheet 120, but also arranged between the through holes 120*a* and the through holes 120*a* of the edge portion of the reflective sheet 120.

For example, between the first through hole 121 of the reflective sheet 120 and the second through hole 122 of the reflective sheet 120, three light conversion patches may be arranged. A diameter of the light conversion patch arranged between the first through hole 121 and the second through hole 122 may be between approximately 1.0 mm to 2.0 mm, and appropriately 1.5 mm.

Between the second through hole 122 of the reflective sheet 120 and the third through hole 123 of the reflective sheet 120, three light conversion patches may be arranged. A diameter of the light conversion patch arranged between the second through hole 122 and the third through hole 123 may be between approximately 0.8 mm to 1.5 mm, and appropriately 1.3 mm.

Three light conversion patches may be arranged on an inside of the third through hole 123 of the reflective sheet 120. A diameter of the light conversion patch arranged inside the third through hole 123 may be between approximately 0.5 mm and 1.1 mm, and appropriately approximately 0.9 mm.

As described above, at the right and left edge portions of the reflective sheet 120, the first light conversion patch 210, the second light conversion patches 220 and/or the third light conversion patch 230 may be arranged.

The size of each of the first light conversion patches 210 arranged at the outermost side of the left and right edge portions of the reflective sheet 120 is greater than the size of each of the second light conversion patches 220 arranged more inside than the first light conversion patches 210. The distance between the first light conversion patches 210 is less than the distance between the second light conversion patches 220. Further, the number of the first light conversion patches 210 is greater than the number of the second light conversion patches 220.

The size of each of the second light conversion patches 220 is greater than the size of each of the third light conversion patches 230 arranged further inside than the second light conversion patches 220. The distance between the second light conversion patches 220 is less than the distance between the third light conversion patches 230. Further, the number of the second light conversion patches 220 is greater than the number of the third light conversion patches 230.

As mentioned above, as the distance from the left and right edges 120*b* of the reflective sheet 120 to the light conversion patch 200 is increased, the size of the light conversion patch 200 may be reduced, the distance between the light conversion patches 200 may be increased, and the number of light conversion patches 200 may be reduced. In addition, as the distance from the left and right edges 120*b* of the reflective sheet 120 to the light conversion patch 200 is increased, a ratio of an area occupied by the light conversion patch 200 may be reduced.

Accordingly, when the light is reflected by the edge portion of the reflective sheet 120, the ratio of blue light contained in the light may be reduced, and the ratio of yellow light may be further increased. It is possible to relieve a difficulty in which an amount of light L5, which has the large number of times transmitted through the light conversion sheet, in the edge portion of the light source apparatus 100 is less than an amount of light L5 in the central portion of the light source apparatus 100. Further, a defect, in which the edge portion of the light source apparatus 100 is more bluish than the central portion of the light source apparatus 100 may be eliminated.

Figure 11:
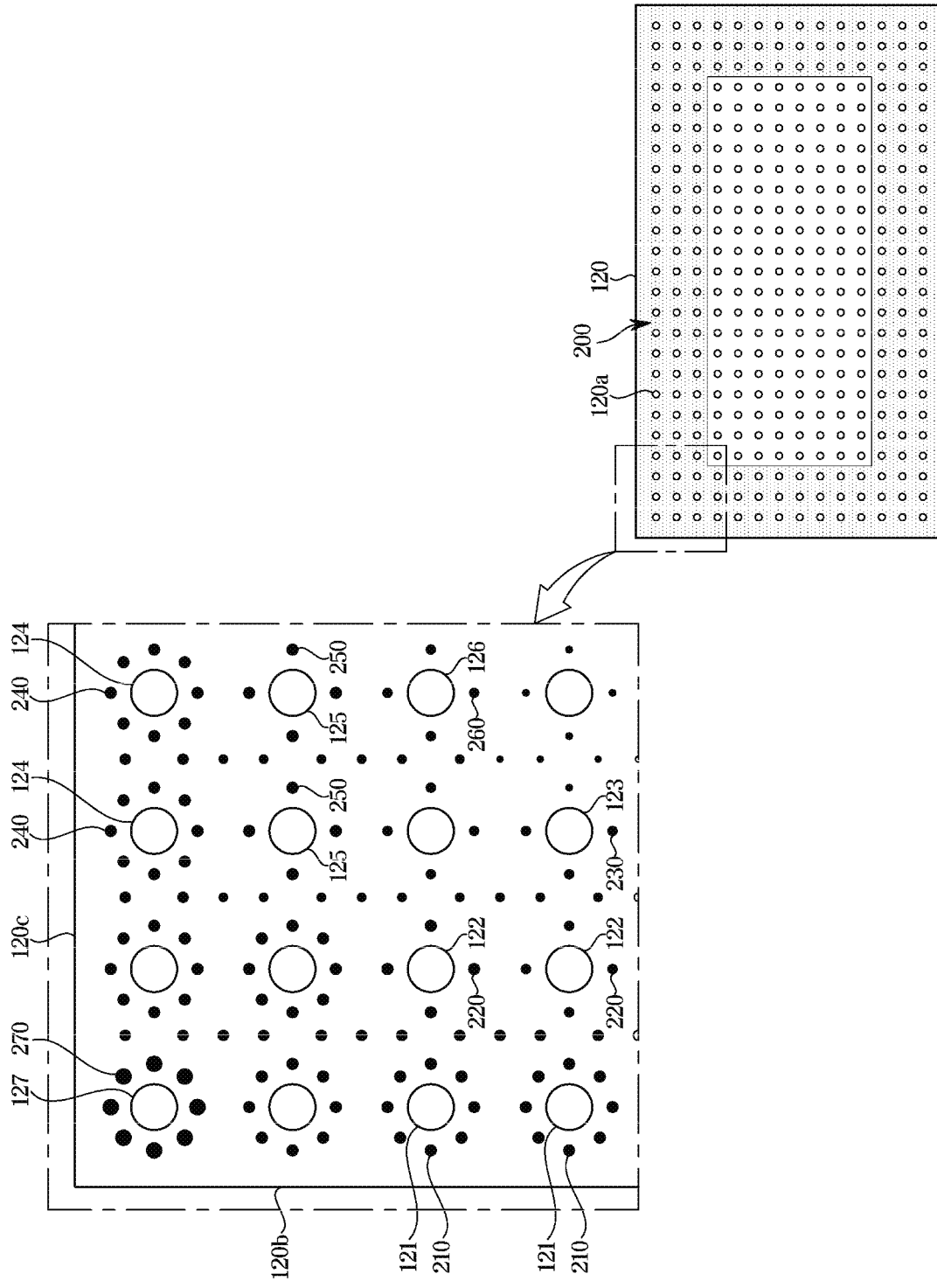
FIG. 11 is a view of an example of an arrangement of the light conversion patch of a corner portion of the light source apparatus according to an exemplary embodiment of the present disclosure.

FIG. 11 is a view of an example of an arrangement of the light conversion patch of a corner portion of the light source apparatus according to an exemplary embodiment of the present disclosure.

FIG. 10 illustrates the arrangement of the light conversion patch 200 at the left and right edges of the light source apparatus 100, but the light conversion patch 200 may be also arranged at upper and lower edges of the light source apparatus 100. Further, the light conversion patch 200 may be arranged at a corner portion of the light source apparatus 100.

As illustrated in FIG. 11, on the reflective sheet 120, the plurality of through-holes 120*a* is formed. In addition, the light conversion patch 200 may be applied, printed, or coated on the left and right edge portions, upper and lower edge portions, and corner portions of the reflective sheet 120. The light conversion patch 200 may be the same as the light conversion patch 200 described in FIG. 10.

The light conversion patch 200 may include first light conversion patches 210 arranged around the first through hole 121 in the left and right edge portions of the reflective sheet 120, second light conversion patches 220 arranged around the second through hole 122, and third light conversion patches 230 arranged around the third through hole 123.

A description of the first light conversion patches 210, the second light conversion patches 220, and the third light conversion patches 230 will be replaced with the description of the first light conversion patches 210, the second light conversion patches 220, and the third light conversion patches 230 described with reference to FIG. 10.

The light conversion patch 200 may include a plurality of fourth light conversion patches 240 arranged around a fourth through hole 124 disposed in a first row from the upper and lower edges 120*c* of the reflective sheet 120. For example, eight fourth light conversion patches 240 may be arranged around the fourth through-hole 124. Each of the eight fourth light conversion patches 240 may have a diameter of approximately 1.1 mm to 2.1 mm. The diameter of each of the eight fourth light conversion patches 240 may appropriately be 1.6 mm, and the diameter thereof may have an error margin of ±20%.

The plurality of fourth light conversion patches 240 may be arranged at approximately equal intervals along a circumference of a virtual circle surrounding the fourth through hole 124. In addition, the plurality of fourth light conversion patches 240 may be arranged at approximately equal angular intervals with respect to a virtual central point in the fourth through hole 124. For example, the eight fourth light conversion patches 240 may be arranged at an angular interval of approximately 45 degrees with respect to the virtual central point in the fourth through hole 124.

The light conversion patch 200 may include a plurality of fifth light conversion patches 250 arranged around a fifth through hole 125 disposed in a second row from the upper and lower edges 120*c* of the reflective sheet 120. For example, four fifth light conversion patches 250 may be arranged around the fifth through hole 125. Each of the four fifth light conversion patches 250 may have a diameter of approximately 0.9 mm to 1.6 mm. The diameter of each of the fifth light conversion patches 250 may appropriately be 1.4 mm, and the diameter thereof may have an error margin of ±20%.

The plurality of fifth light conversion patches 250 may be arranged at approximately equal intervals along a circumference of a virtual circle surrounding the fifth through hole 125. In addition, the plurality of fifth light conversion patches 250 may be arranged at approximately equal angular intervals with respect to a virtual central point in the fifth through hole 125. For example, the four fifth light conversion patches 250 may be arranged at an angular interval of approximately 90 degrees with respect to the virtual central point in the fifth through hole 125.

The light conversion patch 200 may include a plurality of sixth light conversion patches 260 arranged around a sixth through hole 126 disposed in a third row from the upper and lower edge portion of the reflective sheet 120. For example, three sixth light conversion patches 260 may be arranged around the sixth through hole 126. Each of the three sixth light conversion patches 260 may have a diameter of approximately 0.7 mm to 1.4 mm. The diameter of each of the sixth light conversion patches 260 may appropriately be 1.2 mm, and the diameter thereof may have an error margin of ±20%.

The plurality of sixth light conversion patches 260 may be arranged at approximately equal intervals along a circumference of a virtual circle surrounding the sixth through hole 126. For example, the three sixth light conversion patches 260 may be arranged at an angular interval of approximately 45 degrees or approximately 90 degrees with respect to the virtual central point in the sixth through hole 126.

In addition, a seventh through hole 127 is arranged at the corner portion of the reflective sheet 120, and the seventh through hole 127 is arranged closest to the corner of the reflective sheet 120. In other words, a distance between the corner of the reflective sheet 120 and the seventh through hole 127 may be minimized such that the distance between the corner of the reflective sheet 120 and the seventh through hole is less than the distance between the corner of the reflection sheet 120 and the other through holes. A plurality of seventh light conversion patches 270 may be arranged around the seventh through hole 127. For example, eight seventh light conversion patches 270 may be arranged around the seventh through hole 127. Each of the eight seventh light conversion patches 270 may have a diameter of approximately 1.5 mm to 2.5 mm. The diameter of each of the seventh light conversion patches 270 may appropriately be 2.0 mm, and the diameter thereof may have an error margin of ±20%.

The plurality of seventh light conversion patches 270 may be arranged at approximately equal intervals along a circumference of a virtual circle surrounding the seventh through hole 127. In addition, the plurality of seventh light conversion patches 270 may be arranged at approximately equal angular intervals with respect to a virtual central point in the seventh through hole 127. For example, the eight seventh light conversion patches 270 may be arranged at an angular interval of approximately 45 degrees with respect to the virtual central point in the seventh through hole 127.

As described above, in the upper and lower edge portions of the reflective sheet 120, the fourth light conversion patches 240, the fifth light conversion patches 250, and/or the sixth light conversion patches 260 may be arranged.

The size of each of the fourth light conversion patches 240 arranged at the outermost side of the upper and lower edge portions of the reflective sheet 120 is greater than the size of each of the fifth and sixth light conversion patches 250 and 260 arranged more inside than the first light conversion patches 210. The distance between the fourth light conversion patches 240 is less than the distance between the fifth and sixth light conversion patches 250 and 260. Further, the number of the fourth light conversion patches 240 is greater than the number of the fifth and sixth light conversion patches 250 and 260.

As mentioned above, as the distance from the upper and lower edges 120c of the reflective sheet 120 to the light conversion patch 200 is increased, the size of the light conversion patch 200 may be reduced, the distance between the light conversion patches 200 may be increased, and the number of light conversion patches 200 may be reduced. In addition, a ratio of an area occupied by the light conversion patch 200 may be reduced as the distance from outermost side of the upper and lower edge portions towards the center portion of the reflective sheet 120 is increased.

The size of the light conversion patches 240, 250, and 260 arranged on the upper and lower edge portions of the reflective sheet 120 may be different from the size of the light conversion patches 210, 220, and 230 arranged on the left and right edge portions of the reflective sheet 120. For example, the diameter of each of the fourth light conversion patches 240 arranged at the outermost side of the upper and lower edge portions of the reflective sheet 120 may be greater than the diameter of each of the first light conversion patches 210 arranged at the outermost side of the left and right edge portions of the reflective sheet 120. Further, the diameter of each of the fifth and sixth light conversion patches 250 and 260 arranged at the inner side of the outermost side of the upper and lower edge portions of the reflective sheet 120 may be greater than the diameter of each of the second and third light conversion patches 220 and 230 arranged at the inner side of the outermost side of the left and right edge portions of the reflective sheet 120.

The seventh light conversion patch 270 may be arranged at the corner portion of the reflective sheet 120.

The size of the seventh light conversion patches 270 arranged at the corner portions of the reflective sheet 120 may be different from the size of the light conversion patches 210, 220, 230, 240, 250, and 260 arranged at the left and right/upper and lower portion of the reflective sheet 120. For example, the diameter of the seventh light conversion patches 270 may be greater than the diameter of the first and fourth light conversion patches 210 and 240 arranged at the outermost side of the left and right/upper and lower portion of the reflective sheet 120.

Accordingly, when the light is reflected by the corner portion of the reflective sheet 120, the ratio of blue light contained in the light may be reduced, and the ratio of yellow light may be further increased. It is possible to relieve a defect in which an amount of light L5, which has the large number of times transmitted through the light conversion sheet, in the corner portion of the light source apparatus 100 is less than an amount of light L5 in the central portion of the light source apparatus 100. Further, a defect (e.g., optical defect), in which the corner portion of the light source apparatus 100 is more bluish than the central portion of the light source apparatus 100 may be eliminated.

In the above description, the size of the light conversion patches arranged at the outermost side of the left and right/upper and lower edge portions of the reflective sheet 120 is different from the size of the light conversion patches arranged at the inner side of the outermost side, and the distance between the light conversion patches arranged at the outermost side of the left and right/upper and lower edge portions of the reflective sheet 120 is different from the distance between the light conversion patches arranged at the inner side of the outermost side. However, the arrangement of the light conversion patches is not limited to thereto.

Figure 12:
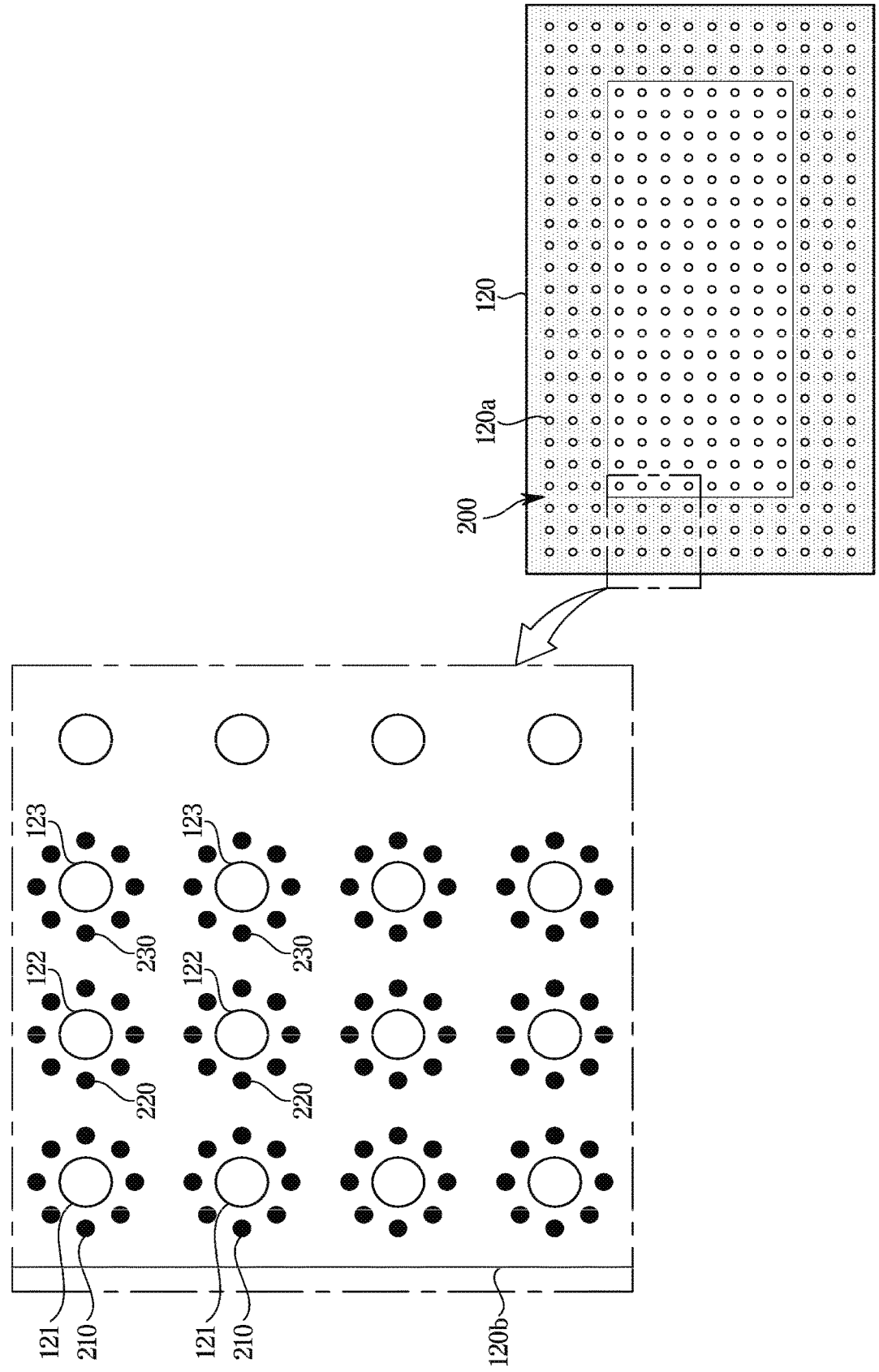
FIG. 12 is a view of an example of the light conversion patch arranged on the left and right edge portions of the light source apparatus according to an exemplary embodiment of the present disclosure.

FIG. 12 is a view of an example of the light conversion patch arranged on the left and right edge portions of the light source apparatus according to an exemplary embodiment of the present disclosure.

As illustrated in FIG. 12, a light conversion patch 200 may be arranged around the through hole 120a at the edge portion of the reflective sheet 120. The light conversion patch 200 may be the same as the light conversion patch described with reference to FIG. 10.

The light conversion patch 200 may include a plurality of first light conversion patches 210 arranged around a first through hole 121 disposed in a first column in left and right edges 120b of the reflective sheet 120. The size, arrangement, and number of the first light conversion patches 210 may be the same as the first light conversion patches 210 shown in FIG. 10. For example, the eight first light conversion patches 210 may be arranged at an angular interval of approximately 45 degrees with respect to the virtual central point in the first through hole 121.

The light conversion patch 200 may include a plurality of second light conversion patches 220 arranged around a second through hole 122 disposed in a second column in the left and right edges 120b of the reflective sheet 120.

Unlike the second light conversion patches 220 shown in FIG. 10, the size of the second light conversion patches 220 shown in FIG. 12 may be approximately equal to the size of the first light conversion patches 210. In other words, the diameter of the second light conversion patches 220 may be approximately equal to the diameter of the first light conversion patches 210. For example, the diameter of the first light conversion patches 210 may be approximately 1.5 mm, and the diameter of the second light conversion patches 220 may also be approximately 1.5 mm.

The plurality of second light conversion patches 220 may be arranged at approximately equal intervals along a circumference of a virtual circle surrounding the second through hole 122, and the number of the second light conversion patches 220 may be the same as the number of the first light conversion patches 210. For example, the eight second light conversion patches 220 may be arranged at an angular interval of approximately 45 degrees with respect to the virtual central point in the second through hole 122.

The light conversion patch 200 may include a plurality of third light conversion patches 230 arranged around a third through hole 123 disposed in a third column in the left and right edges 120b of the reflective sheet 120.

Unlike the third light conversion patches 230 shown in FIG. 10, the size of the third light conversion patches 230 shown in FIG. 12 may be approximately equal to the size of the first light conversion patches 210. In other words, the diameter of the third light conversion patches 230 may be approximately equal to the diameter of the first light conversion patches 210. For example, based on the diameter of the first light conversion patches 210 may be approximately 1.5 mm, and the diameter of the third light conversion patches 230 may also be approximately 1.5 mm.

The plurality of third light conversion patches 230 may be arranged at approximately equal intervals along a circumference of a virtual circle surrounding the third through hole 123, and the number of the third light conversion patches 230 may be the same as the number of the first light conversion patches 210. For example, the eight third light conversion patches 230 may be arranged at an angular interval of approximately 45 degrees with respect to the virtual central point in the third through hole 123.

Although not shown in FIG. 12, the light conversion patch 200 may include a plurality of fourth light conversion patches arranged around a fourth through hole disposed in a first row in the upper and lower edges 120c of the reflective sheet 120, a plurality of fifth light conversion patches arranged around a fifth through hole disposed in a second row, or a plurality of sixth light conversion patches arranged around a sixth through hole disposed in a third row.

The size of the fourth, fifth, and sixth light conversion patches may be the same as the size of the first light conversion patches 210, and the number of the fourth, fifth, and sixth light conversion patches may be the same as the number of the first light conversion patches 210.

The light conversion patch 200 may include a plurality of seventh light conversion patches arranged around a seventh through hole disposed at the corner portion of the reflective sheet, and the size, number, and arrangement of the seventh light conversion patches may be the same as the size, number, and arrangement of the first light conversion patches 210.

Further, unlike that illustrated in FIG. 12, the second light conversion patches 220 may be omitted, or the third light conversion patches 230 may be omitted, or the second and third light conversion patches 220 and 230 may be omitted. In other words, the light conversion patch 200 may include only the first light conversion patches 210, or may include the first and second light conversion patches 210 and 220, or may include the first and third light conversion patches 210 and 230.

Figure 13:
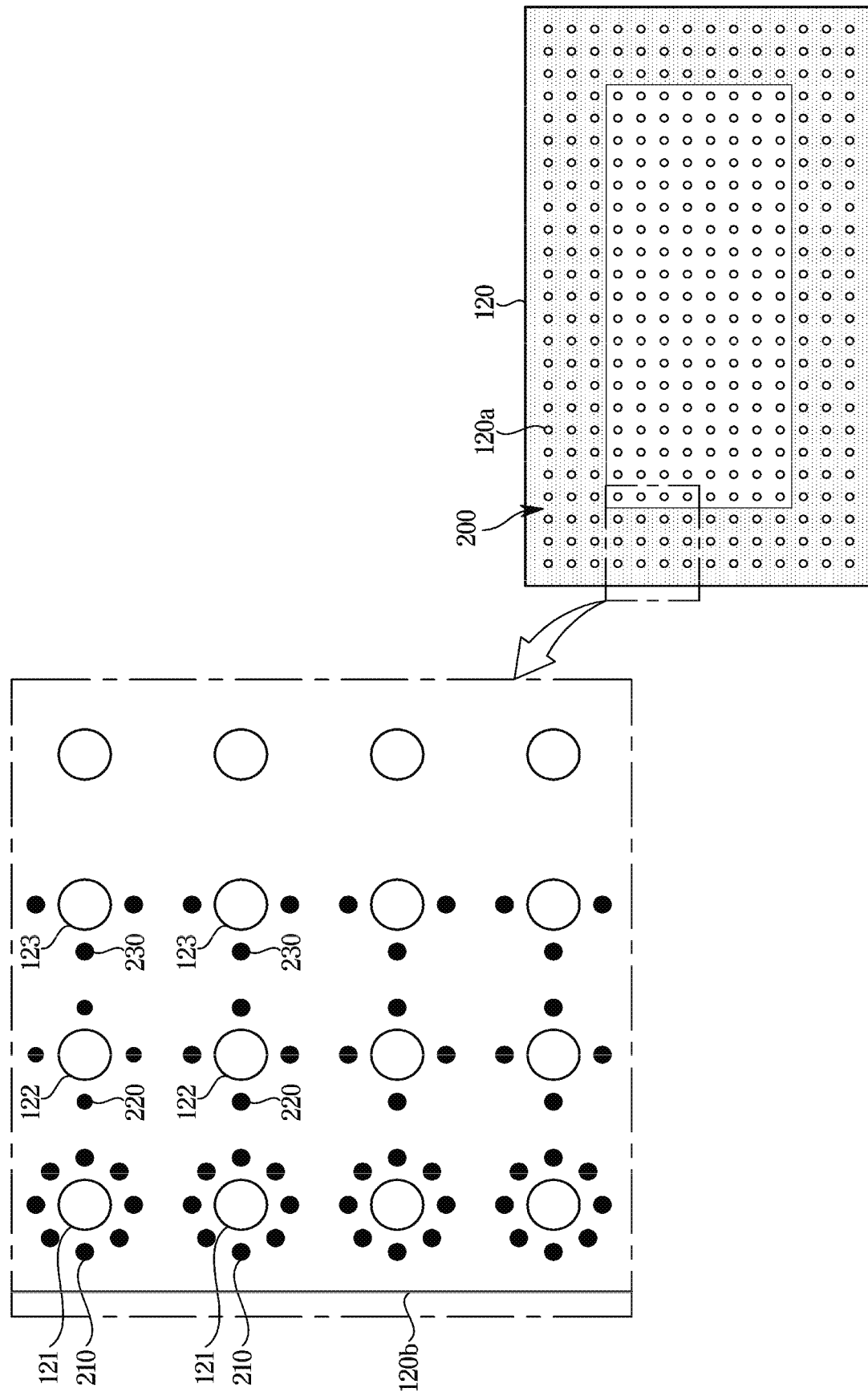
FIG. 13 is a view of an example of the light conversion patch arranged on the left and right edge portions of the light source apparatus according to an exemplary embodiment of the present disclosure.

FIG. 13 is a view of an example of the light conversion patch arranged on the left and right edge portions of the light source apparatus according to an exemplary embodiment of the present disclosure.

As illustrated in FIG. 13, a light conversion patch 200 may be arranged around the through hole 120a at the edge portion of the reflective sheet 120. The light conversion patch 200 may be the same as the light conversion patch described with reference to FIG. 10.

The light conversion patch 200 may include a plurality of first light conversion patches 210 arranged around a first through hole 121 disposed in a first column from left and right edges 120b of the reflective sheet 120. The size, arrangement, and number of the first light conversion patches 210 may be the same as the first light conversion patches 210 shown in FIG. 10. For example, the eight first light conversion patches 210 may be arranged at an angular interval of approximately 45 degrees with respect to a virtual central point in the first through hole 121.

The light conversion patch 200 may include a plurality of second light conversion patches 220 arranged around a second through hole 122 disposed in a second column from the left and right edges 120b of the reflective sheet 120.

Unlike the second light conversion patches 220 shown in FIG. 10, the size of the second light conversion patches 220 shown in FIG. 13 may be approximately equal to the size of the first light conversion patches 210. For example, the diameter of the first light conversion patches 210 may be approximately 1.5 mm, and the diameter of the second light conversion patches 220 may also be approximately 1.5 mm.

The number of the second light conversion patches 220 may be less than the number of the first light conversion patches 210, and the plurality of second light conversion patches 220 may be arranged at approximately equal intervals along a circumference of a virtual circle surrounding the second through hole 122. For example, the eight second light conversion patches 220 may be arranged at an angular interval of approximately 45 degrees with respect to the virtual central point in the second through hole 122.

The light conversion patch 200 may include a plurality of third light conversion patches 230 arranged around a third through hole 123 disposed in a third column from the left and right edges 120b of the reflective sheet 120.

Unlike the third light conversion patches 230 shown in FIG. 10, the size of the third light conversion patches 230 shown in FIG. 13 may be approximately equal to the size of the first light conversion patches 210. For example, the diameter of the first light conversion patches 210 may be approximately 1.5 mm, and the diameter of the third light conversion patches 230 may also be approximately 1.5 mm.

The number of the third light conversion patches 230 may be less than the number of the second light conversion patches 220, and the plurality of third light conversion patches 230 may be arranged at approximately equal intervals along a circumference of a virtual circle surrounding the third through hole 123. For example, the three third light conversion patches 230 may be arranged at an angular interval of approximately 90 degrees or approximately 180 degrees with respect to the virtual central point in the third through hole 123.

Although not shown in FIG. 13, the light conversion patch 200 may include a plurality of fourth light conversion patches, a plurality of fifth light conversion patches or a plurality of sixth light conversion patches.

The size of the fourth, fifth, and sixth light conversion patches may be the same as the size of the first light conversion patches 210.

The number and arrangement of the fourth light conversion patches may be the same as the number and arrangement of the first light conversion patches 210. The number and arrangement of the fifth light conversion patches may be the same as the number and arrangement of the second light conversion patches 220. The number and arrangement of the sixth light conversion patches may be the same as the number and arrangement of the fifth light conversion patches 250.

The light conversion patch 200 may include a plurality of seventh light conversion patches arranged around a seventh through hole disposed at the corner portion of the reflective sheet, and the size, number, and arrangement of the seventh light conversion patches may be the same as the size, number, and arrangement of the first light conversion patches 210.

Figure 14:
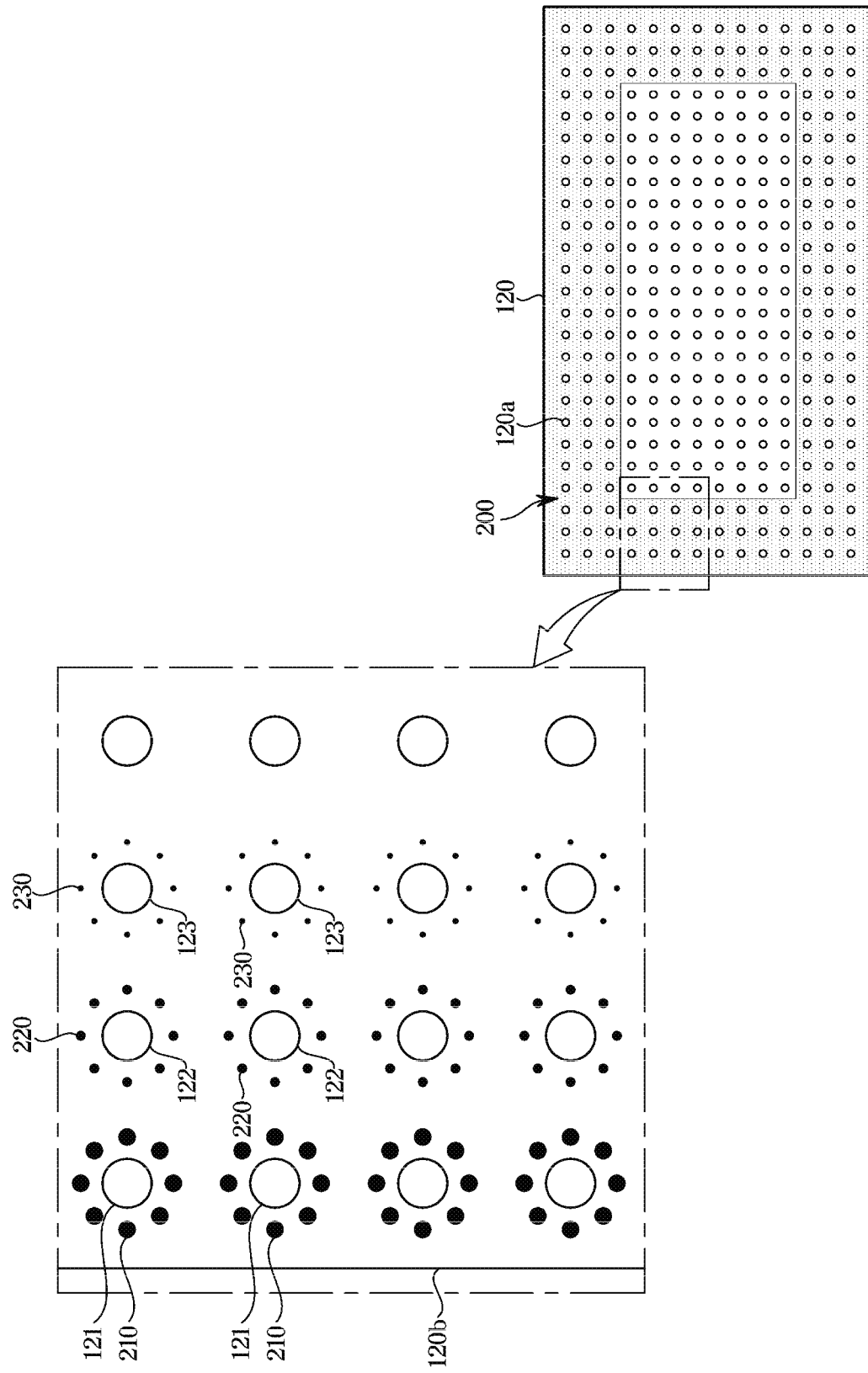
FIG. 14 is a view of an example of the light conversion patch arranged on the left and right edge portions of the light source apparatus according to an exemplary embodiment of the present disclosure.

FIG. 14 is a view of an example of the light conversion patch arranged on the left and right edge portions of the light source apparatus according to an exemplary embodiment of the present disclosure.

As illustrated in FIG. 14, a light conversion patch 200 may be arranged around the through hole 120a at the edge portion of the reflective sheet 120. The light conversion patch 200 may be the same as the light conversion patch described with reference to FIG. 10.

The light conversion patch 200 may include a plurality of first light conversion patches 210 arranged around a first through hole 121 disposed in a first column from left and right edges 120b of the reflective sheet 120. The size, arrangement, and number of the first light conversion patches 210 may be the same as the first light conversion patches 210 shown in FIG. 10. For example, the eight first light conversion patches 210 may be arranged at an angular interval of approximately 45 degrees with respect to the virtual central point in the first through hole 121.

The light conversion patch 200 may include a plurality of second light conversion patches 220 arranged around a second through hole 122 disposed in a second column from the left and right edges 120b of the reflective sheet 120.

The size of the second light conversion patches 220 may be less than the size of the first light conversion patches 210. For example, based on the diameter of the first light conversion patches 210 being approximately 1.5 mm, the diameter of the second light conversion patches 220 may also be approximately 1.3 mm.

Unlike the second light conversion patches 220 shown in FIG. 10, the number of the second light conversion patches 220 shown in FIG. 14 may be the same as the number of the first light conversion patches 210. The plurality of second light conversion patches 220 may be arranged at approximately equal intervals along a circumference of a virtual circle surrounding the second through hole 122. For example, the eight second light conversion patches 220 may be arranged at an angular interval of approximately 45 degrees with respect to the virtual central point in the second through hole 122.

The light conversion patch 200 may include a plurality of third light conversion patches 230 arranged around a third through hole 123 disposed in a third column from the left and right edges 120b of the reflective sheet 120.

The size of the third light conversion patches 230 may be less than the size of the second light conversion patches 220. For example, the diameter of the second light conversion patches 220 may be approximately 1.3 mm, and the diameter of the third light conversion patches 230 may also be approximately 1.1 mm.

Unlike the third light conversion patches 230 shown in FIG. 10, the number of the third light conversion patches 230 shown in FIG. 14 may be the same as the number of the first and second light conversion patches 210 and 220. The plurality of third light conversion patches 230 may be arranged at approximately equal intervals along a circumference of a virtual circle surrounding the third through hole 123. For example, the eight third light conversion patches 230 may be arranged at an angular interval of approximately 45 degrees with respect to the virtual central point in the third through hole 123.

Although not shown in FIG. 14, the light conversion patch 200 may include a plurality of fourth light conversion patches, a plurality of fifth light conversion patches or a plurality of sixth light conversion patches.

The size of the fourth light conversion patches may be the same as the size of the first light conversion patches 210, the size of the fifth light conversion patches may be the same as the size of the second light conversion patches 220, and the size of the sixth light conversion patches may be the same as the size of the fifth light conversion patches 250.

The number and arrangement of the fourth, fifth, and sixth light conversion patches may be the same as the number and arrangement of the first light conversion patch 210.

The light conversion patch 200 may include a plurality of seventh light conversion patches arranged around a seventh through hole disposed at the corner portion of the reflective sheet, and the size, number, and arrangement of the seventh light conversion patches may be the same as the size, number, and arrangement of the first light conversion patches 210.

Figure 15:
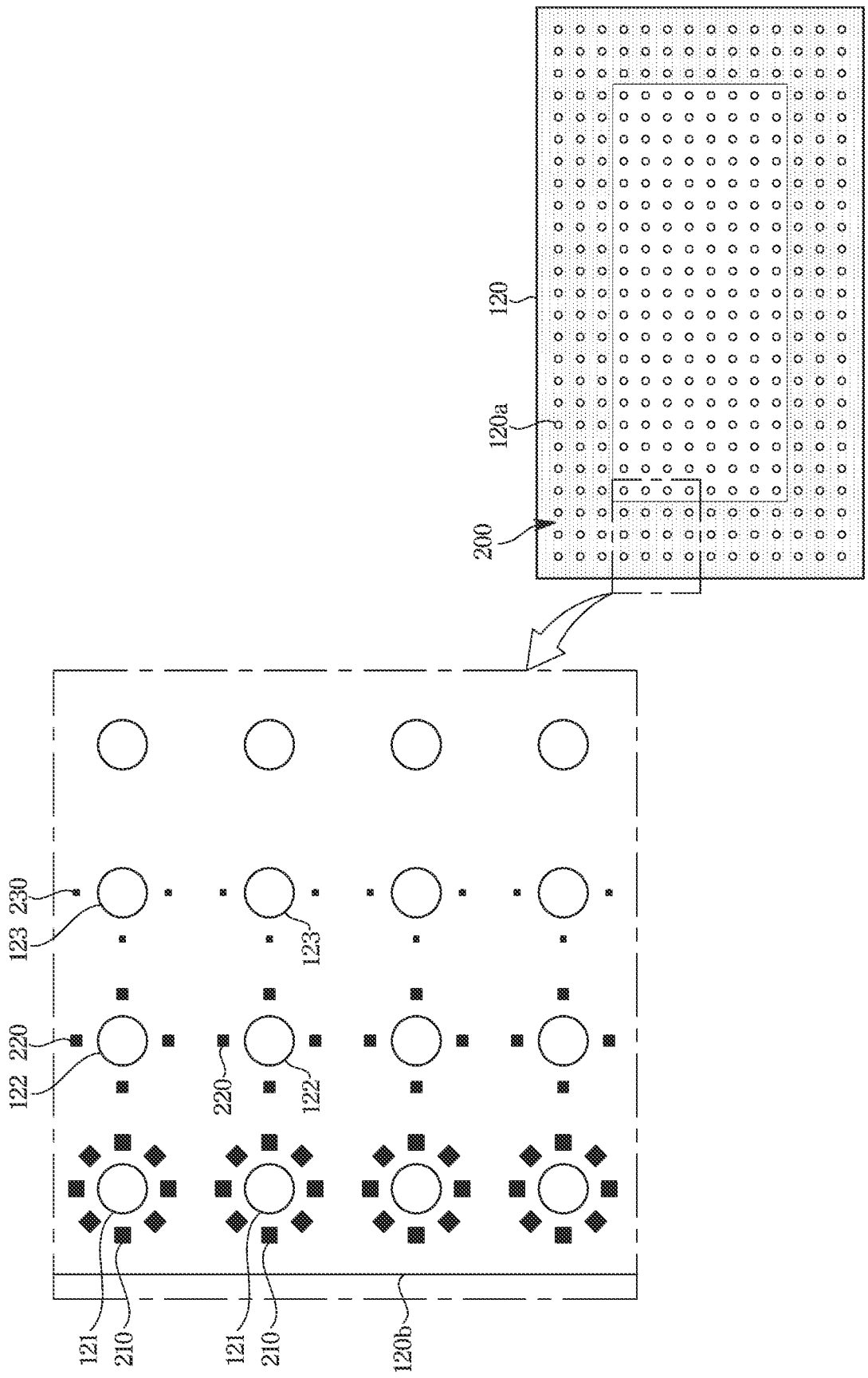
FIG. 15 is a view of an example of the light conversion patch arranged on the left and right edge portions of the light source apparatus according to an exemplary embodiment of the present disclosure.

FIG. 15 is a view of an example of the light conversion patch arranged on the left and right edge portions of the light source apparatus according to an exemplary embodiment of the present disclosure.

As illustrated in FIG. 15, a light conversion patch 200 may be arranged around a through hole at an edge portion of the reflective sheet 120.

The light conversion patch 200 may include a light conversion material that absorbs a portion of blue light among incident light and converts a portion of the absorbed blue light into yellow light, red light, or green light. In addition, the light conversion patch 200 may include a light conversion material that absorbs a portion of blue light and reflects yellow light, red light, or green light among incident light.

The light conversion patch 200 may be approximately a quadrangle. However, the shape of the light conversion patch 200 is not limited to a quadrangle, and thus the shape of the light conversion patch 200 may be a polygon including a triangle, a pentagon, or a hexagon.

The light conversion patch 200 may include a plurality of first light conversion patches 210 arranged around a first through hole 121 disposed in a first column from the left and right edges 120b of the reflective sheet 120. The arrangement, and number of the first light conversion patches 210 may be the same as the first light conversion patches 210 shown in FIG. 10. For example, the eight first light conversion patches 210 may be arranged at an angular interval of approximately 45 degrees with respect to the virtual central point in the first through hole 121.

Each of the first light conversion patches 210 may be a square having one side of approximately 1.5 mm.

The light conversion patch 200 may include a plurality of second light conversion patches 220 arranged around a second through hole 122 disposed in a second column in the left and right edges 120b of the reflective sheet 120.

The size of the second light conversion patches 220 may be less than the size of the first light conversion patches 210. For example, the second light conversion patches 220 may have a square shape including a side of approximately 1.3 mm.

The number of the second light conversion patches 220 may be less than the number of the first light conversion patches 210, and the plurality of second light conversion patches 220 may be arranged at approximately equal intervals along a circumference of a virtual circle surrounding the second through hole 122. For example, the four second light conversion patches 220 may be arranged at an angular interval of approximately 90 degrees with respect to the virtual central point in the second through hole 122.

The light conversion patch 200 may include a plurality of third light conversion patches 230 arranged around a third through hole 123 disposed in a third column from the left and right edges 120b of the reflective sheet 120.

The size of the third light conversion patches 230 may be less than the size of the second light conversion patches 220. For example, the third light conversion patches 230 may have a square shape including a side of approximately 1.1 mm.

The number of the third light conversion patches 230 may be less than the number of the second light conversion patches 220, and the plurality of third light conversion patches 230 may be arranged at approximately equal intervals along a circumference of a virtual circle surrounding the second through hole 122. For example, the three third light conversion patches 230 may be arranged at an angular interval of approximately 90 degrees or approximately 180 degrees with respect to the virtual central point in the third through hole 123.

Although not shown in FIG. 15, the light conversion patch 200 may include a plurality of fourth light conversion patches, a plurality of fifth light conversion patches or a plurality of sixth light conversion patches. Each of the fourth, fifth, and sixth light conversion patches may be formed in a polygon shape including a quadrangle, a triangle, a pentagon, or a hexagon.

The size, number, and arrangement of the fourth light conversion patches may be the same as the size, number, and arrangement of the first light conversion patches 210. The size, number, and arrangement of the fifth light conversion patches may be the same as the size, number, and arrangement of the second light conversion patches 220. The size, number, and arrangement of the sixth light conversion patches may be the same as the size, number, and arrangement of the fifth light conversion patches 250.

The light conversion patch 200 may include a plurality of seventh light conversion patches arranged around a seventh through hole disposed at the corner portion of the reflective sheet, and the size, number, and arrangement of the seventh light conversion patches may be the same as the size, number, and arrangement of the first light conversion patches 210.

Figure 16:
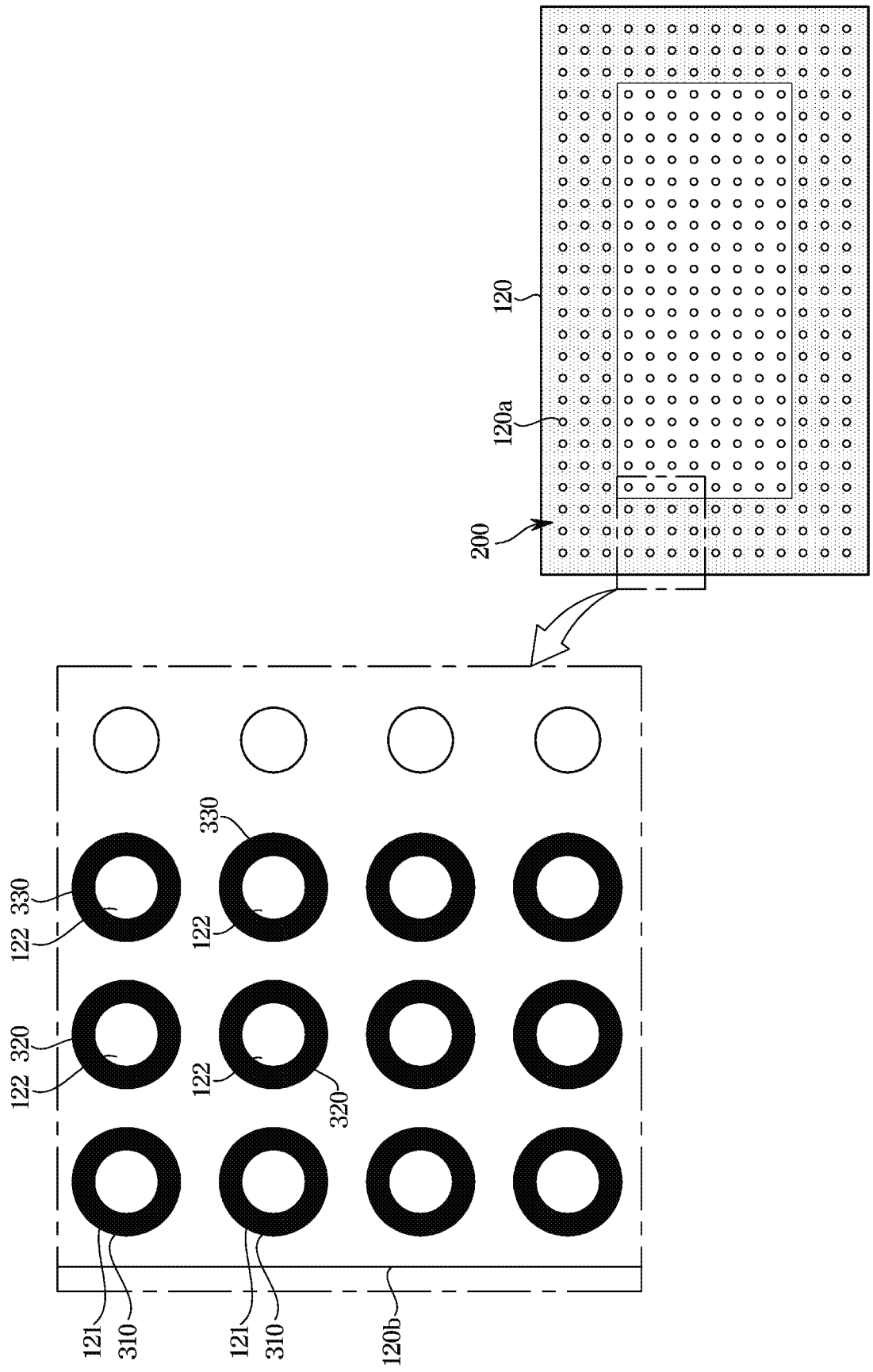
FIG. 16 is a view of an example of the light conversion patch arranged on the left and right edge portions of the light source apparatus according to an exemplary embodiment of the present disclosure.

FIG. 16 is a view of an example of the light conversion patch arranged on the left and right edge portions of the light source apparatus according to an exemplary embodiment of the present disclosure.

As illustrated in FIG. 16, a light conversion patch 200 may be arranged around a through hole at an edge portion of the reflective sheet 120.

The light conversion patch 200 may include a light conversion material that absorbs a portion of blue light among incident light and converts a portion of the absorbed blue light into yellow light, red light, or green light. In addition, the light conversion patch 200 may include a light conversion material that absorbs a portion of blue light and reflects yellow light, red light, or green light among incident light.

The light conversion patch 200 may have a shape that approximately forms ring surrounding the through holes 120a. In FIG. 16, the light conversion patch 200 having a substantially ring shape is illustrated, but is not limited thereto. For example, the light conversion patch 200 may be formed in various ring shapes surrounding the through holes, such as an oval ring, a square ring, a pentagonal ring, and a hexagonal ring.

The light conversion patch 200 may include a plurality of first light conversion bands 310 arranged around a first through hole 121 disposed in a first column from the left and right edges 120b of the reflective sheet 120. For example, the first light conversion bands 310 may be formed in a ring shape having a width of approximately 1.5 mm.

The light conversion patch 200 may include a plurality of second light conversion bands 320 arranged around a second through hole 122 disposed in a second column from the left and right edges 120b of the reflective sheet 120. The shape, size and number of the second light conversion bands 320 may be the same as the shape, size and number of the first light conversion bands 310. For example, the second light conversion bands 320 may be formed in a ring shape having a width of approximately 1.5 mm.

The light conversion patch 200 may include a plurality of third light conversion bands 330 arranged around a third through hole 123 disposed in a third column from the left and right edges 120b of the reflective sheet 120. The shape, size and number of the third light conversion bands 330 may be the same as the shape, size and number of the first light conversion bands 310. For example, the third light conversion bands 330 may be formed in a ring shape having a width of approximately 1.5 mm.

Although not shown in FIG. 16, the light conversion patch 200 may further include a plurality of fourth light conversion bands surrounding a fourth through hole, a plurality of fifth light conversion bands surrounding a fifth through hole, a plurality of sixth light conversion bands surrounding a sixth through hole, or a plurality of seventh light conversion bands surrounding a seventh through hole.

In addition, unlike that shown in FIG. 16, the second light conversion bands 320 may be omitted, or the third light conversion bands 330 may be omitted, or the second and third light conversion bands 320 and 330 may be omitted. In other words, the light conversion patch 200 may include only the first light conversion bands 310, may include the first and second light conversion bands 310 and 320, or may include the first and third light conversion bands 310 and 330.

During the light is reflected by the light conversion bands arranged at the edge portion of the reflective sheet 120, the ratio of blue light contained in the light may be reduced, and the ratio of yellow light may be further increased. Further, a defect (e.g., optical defect), in which the edge portion of the light source apparatus 100 is more bluish than the central portion of the light source apparatus 100 may be eliminated.

Figure 17:
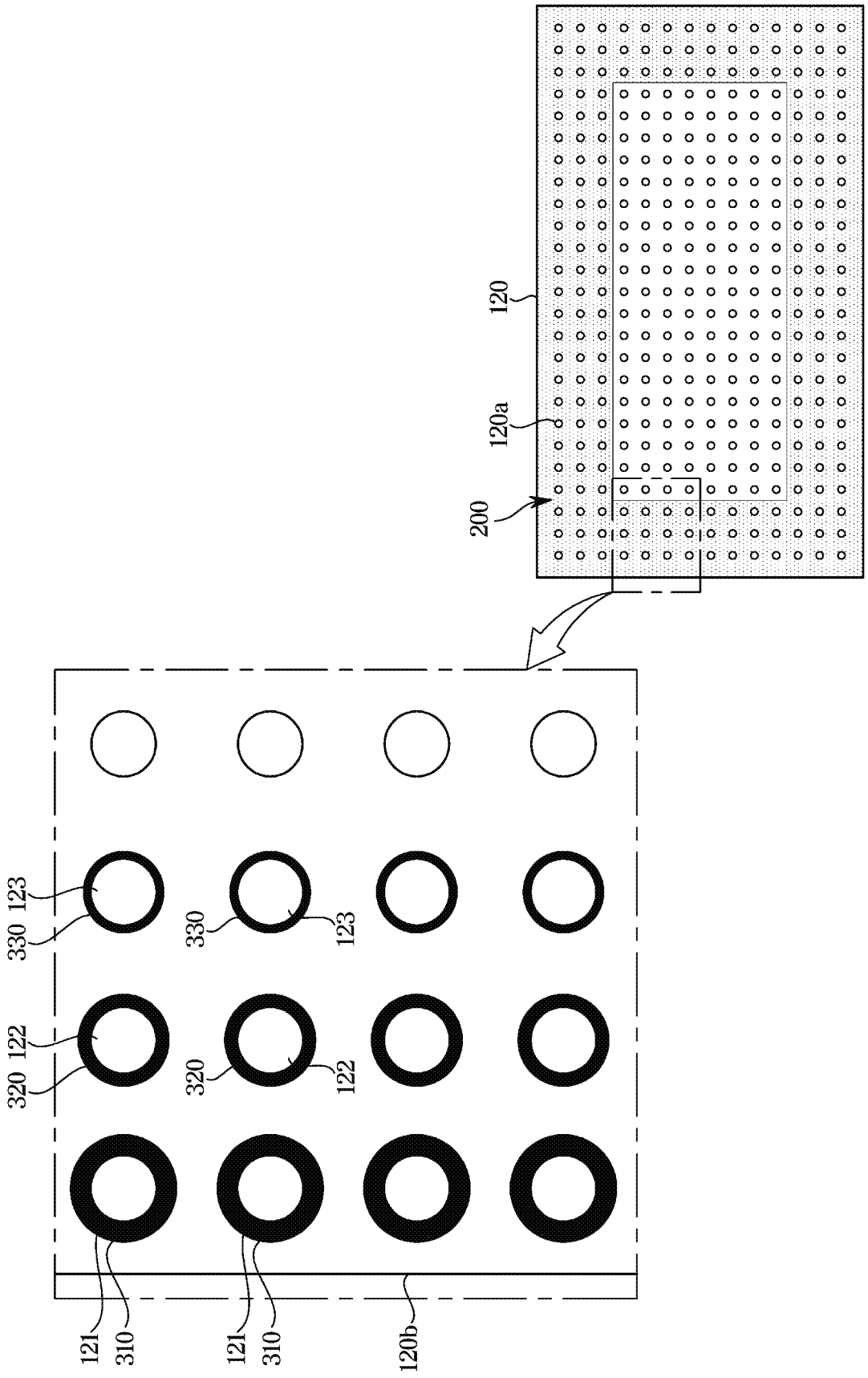
FIG. 17 is a view of an example of the light conversion patch arranged on the left and right edge portions of the light source apparatus according to an exemplary embodiment of the present disclosure.

FIG. 17 is a view of an example of the light conversion patch arranged on the left and right edge portions of the light source apparatus according to an exemplary embodiment of the present disclosure.

As illustrated in FIG. 17, a light conversion patch 200 including a light conversion material may be arranged around a through hole at an edge portion of the reflective sheet 120.

The light conversion patch 200 may include a plurality of first light conversion bands 310 arranged around a first through hole 121 disposed in a first column in left and right edges 120b of the reflective sheet 120. For example, the first light conversion bands 310 may be formed in a ring shape having a width of approximately 1.5 mm.

The light conversion patch 200 may include a plurality of second light conversion bands 320 arranged around a second through hole 122 disposed in a second column in left and right edges 120b of the reflective sheet 120. The size of the second light conversion bands 320 may be less than the size of the first light conversion bands 310. For example, the second light conversion bands 320 may be formed in a ring shape having a width of approximately 1.3 mm.

The light conversion patch 200 may include a plurality of third light conversion bands 330 arranged around a third through hole 123 disposed in a third column in left and right edges 120b of the reflective sheet 120. The size of the third light conversion bands 330 may be less than the size of the second light conversion bands 320. For example, the third light conversion bands 330 may be formed in a ring shape having a width of approximately 1.1 mm.

As mentioned above, at the left and right edge portions of the reflective sheet 120, the first light conversion bands 310, the second light conversion bands 320 and/or the third light conversion bands 330 may be arranged. The width of the first light conversion bands 310 may be greater than the width of the second light conversion bands 320, and the width of the second light conversion bands 320 may be greater than the width of the third light conversion bands 330.

Although not shown in FIG. 17, the light conversion patch 300 may further include a plurality of fourth light conversion bands surrounding a fourth through hole, a plurality of fifth light conversion bands surrounding a fifth through hole, a plurality of sixth light conversion bands surrounding a sixth through hole, or a plurality of seventh light conversion bands surrounding a seventh through hole arranged at the corner of the reflective sheet 120. The fourth light conversion bands may be the same as the first light conversion bands 310, the fifth light conversion bands may be the same as the same as the second light conversion bands 320, the sixth light conversion bands may be the same as the third light conversion bands 330, and the seventh light conversion bands may be the same as the first light conversion bands 310.

Accordingly, as the distance from the left and right edges 120b of the reflective sheet 120 to the light conversion patch 200 is increased, the size (width) of the light conversion patch 200 may be reduced.

Figure 18:
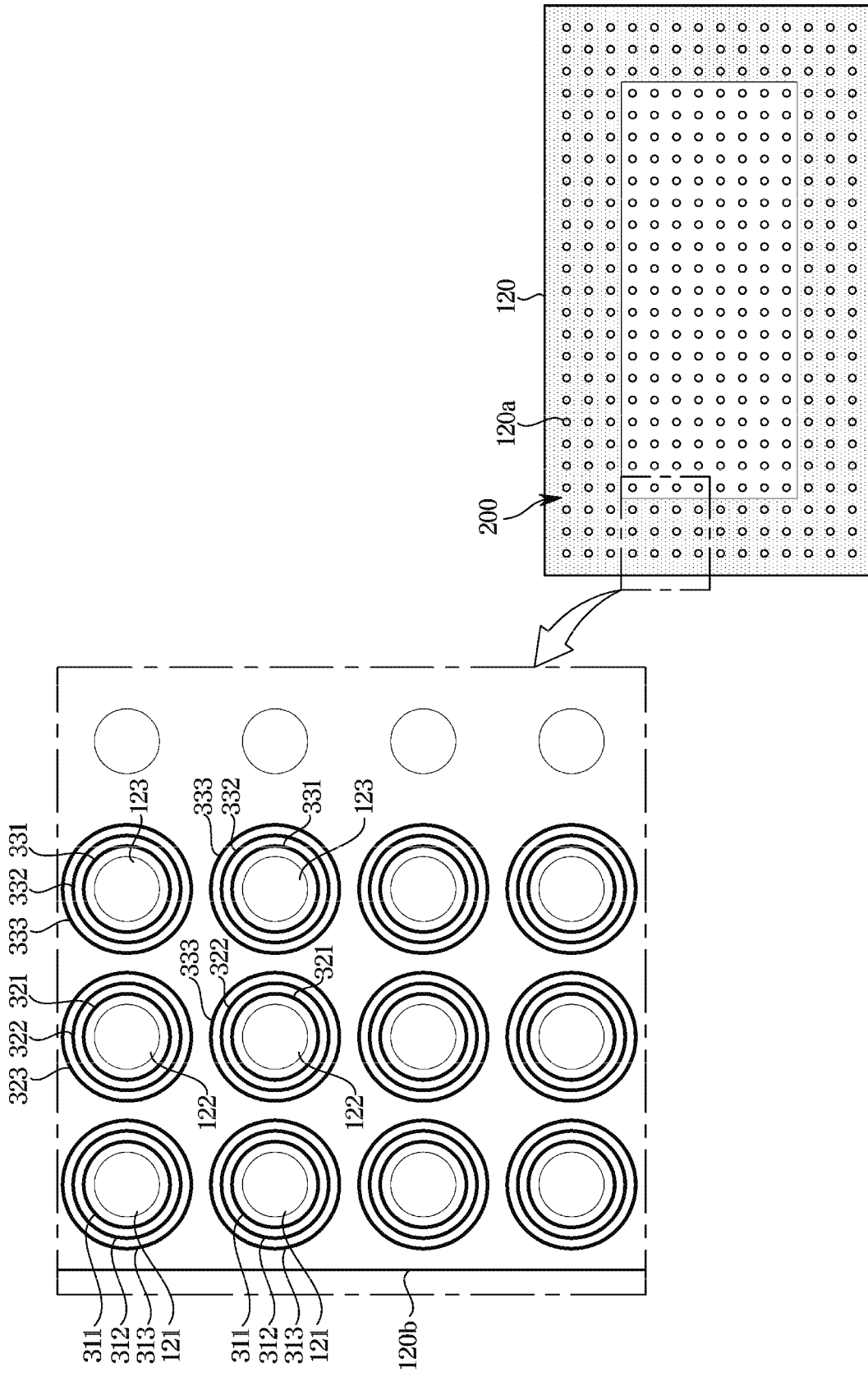
FIG. 18 is a view of an example of the light conversion patch arranged on the left and right edge portions of the light source apparatus according to an exemplary embodiment of the present disclosure.

FIG. 18 is a view of an example of the light conversion patch arranged on the left and right edge portions of the light source apparatus according to an exemplary embodiment of the present disclosure.

As illustrated in FIG. 18, a light conversion patch 200 including a light conversion material may be arranged around a through hole 120a at the edge portion of the reflective sheet 120.

The light conversion patch 200 may be formed in a substantially plurality of circumferential shapes surrounding the through holes 120a. In FIG. 18, the light conversion patch 200 having a substantially circumferential shape is illustrated, but is not limited thereto. For example, the light conversion patch 200 may have various circumferential shapes surrounding through holes, such as an ellipse circumference, a square circumference, a pentagonal circumference, or a hexagonal circumference.

The light conversion patch 200 may include first light conversion lines surrounding a first through hole 121 disposed in a first column from the left and right edges 120b of the reflective sheet 120. For example, the first light conversion lines may include three circumferences 311, 312, and 313 surrounding the first through hole 121.

The light conversion patch 200 may include second light conversion lines surrounding a second through hole 122 disposed in a second column in the left and right edges 120b of the reflective sheet 120. The shape, size, and number of the second light conversion lines may be the same as the shape, size, and number of the first light conversion lines. For example, the second light conversion lines may include three circumferences 321, 322, and 323 surrounding the second through hole 122.

The light conversion patch 200 may include third light conversion lines surrounding a third through hole 123 disposed in a third column in the left and right edges 120b of the reflective sheet 120. The shape, size, and number of the third light conversion lines may be the same as the shape, size, and number of the first light conversion lines. For example, the third light conversion lines may include three circumferences 331, 332, and 333 surrounding the third through hole 123.

Although not shown in FIG. 18, the light conversion patch 200 may further include a plurality of fourth light conversion lines surrounding a fourth through hole, a plurality of fifth light conversion lines surrounding a fifth through hole, a plurality of sixth light conversion lines surrounding a sixth through hole or a plurality of seventh light conversion lines surrounding a seventh through hole.

Unlike that shown in FIG. 18, the second light conversion lines may be omitted, or the third light conversion lines may be omitted, or the second and third light conversion lines may be omitted. In other words, the light conversion patch 200 may include only the first light conversion lines, or may include the first and second light conversion lines, or may include the first and third light conversion lines.

When the light is reflected by the light conversion lines arranged at the edge portion of the reflective sheet 120, the ratio of blue light contained in the light may be reduced, and the ratio of yellow light may be further increased. Further, a defect (optical defect), in which the edge portion of the light source apparatus 100 is more bluish than the central portion of the light source apparatus 100 may be eliminated.

Figure 19:
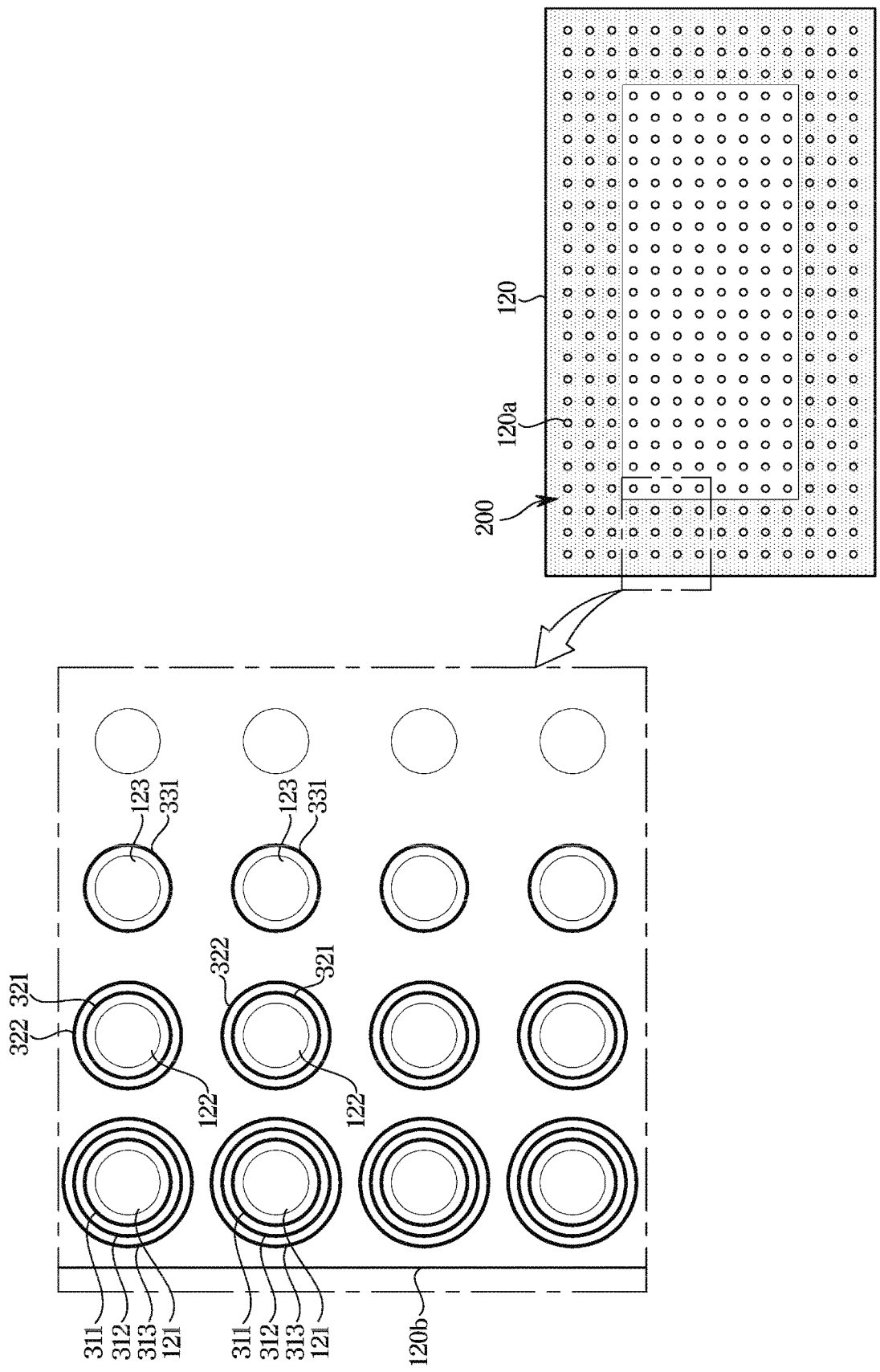
FIG. 19 is a view of an example of the light conversion patch arranged on the left and right edge portions of the light source apparatus according to an exemplary embodiment of the present disclosure.

FIG. 19 is a view of an example of the light conversion patch arranged on the left and right edge portions of the light source apparatus according to an exemplary embodiment of the present disclosure.

As illustrated in FIG. 19, a light conversion patch 200 including a light conversion material may be arranged around a through hole 120a at the edge portion of the reflective sheet 120.

The light conversion patch 200 may include first light conversion lines surrounding a first through hole 121 disposed in a first column from the left and right edges 120b of the reflective sheet 120. For example, the first light conversion lines may include three circumferences 311, 312, and 313 surrounding the first through hole 121.

The light conversion patch 200 may include second light conversion lines surrounding a second through hole 122 disposed in a second column from the left and right edges 120b of the reflective sheet 120. The number of the second light conversion lines may be less than the number of the first light conversion lines. For example, the second light conversion lines may include two circumferences 321 and 322 surrounding the second through hole 122.

The light conversion patch 200 may include third light conversion lines surrounding a third through hole 123 disposed in a third column from the left and right edges 120b of the reflective sheet 120. The number of the third light conversion lines may be less than the number of the second light conversion lines. For example, the third light conversion lines may include a single circumference 331 surrounding the third through hole 123.

Figure 20:
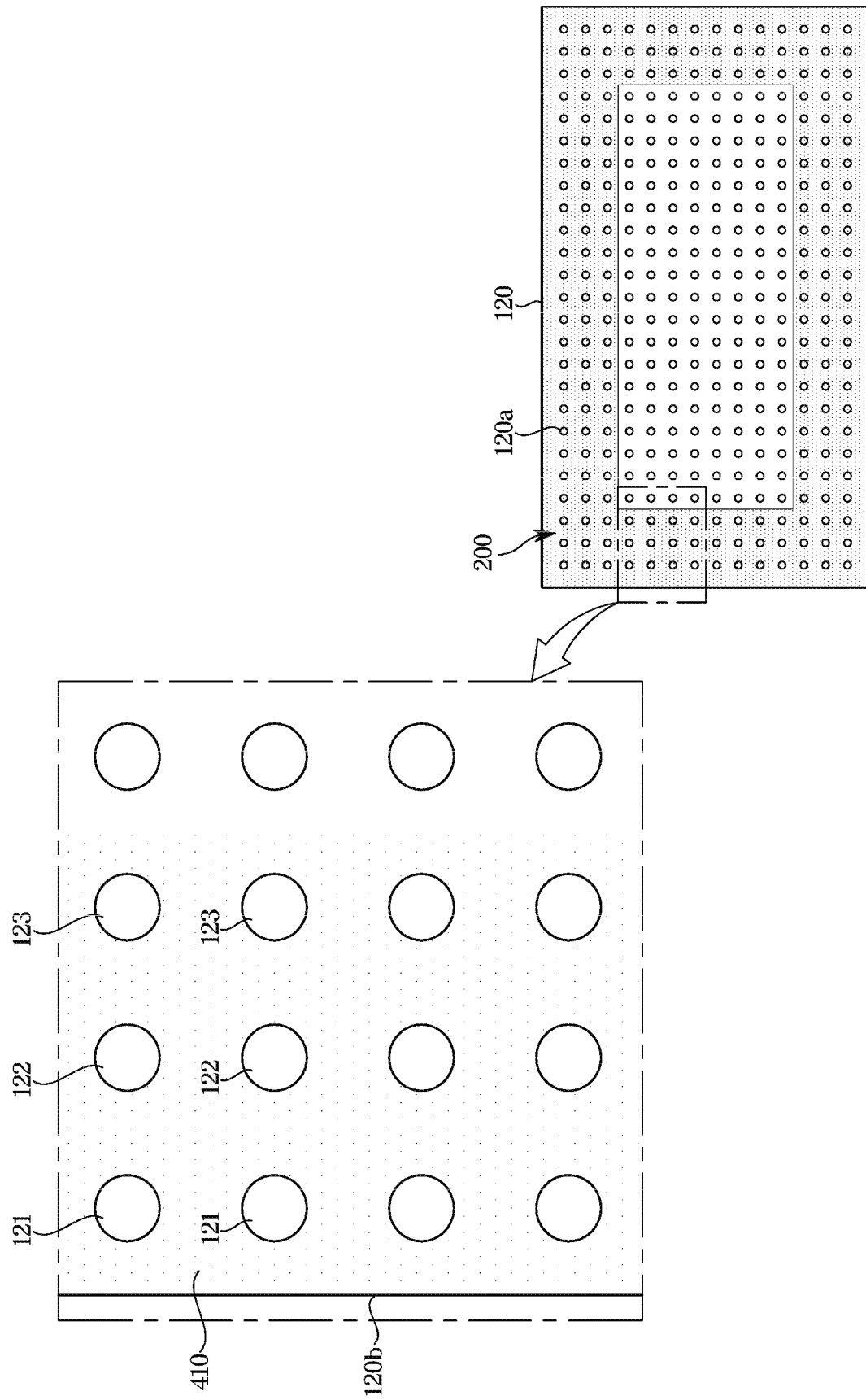
FIG. 20 is a view of an example of the light conversion patch arranged on the left and right edge portions of the light source apparatus according to an exemplary embodiment of the present disclosure.

FIG. 20 is a view of an example of the light conversion patch arranged on the left and right edge portions of the light source apparatus according to an exemplary embodiment of the present disclosure.

As illustrated in FIG. 20, a light conversion patch 200 including a light conversion material may be arranged around through holes 120a at the edge portion of the reflective sheet 120.

The light conversion patch 200 may include a light conversion region 410, in which a light conversion material is dispersed, surrounding the through holes 120a. For example, the light conversion region 410, in which points including the light conversion material are distributed, may be arranged around the through holes 120a.

The light conversion region 410 may be arranged around a first through hole 121 disposed in a first column at the left and right edges 120b of the reflective sheet 120, around a second through hole 122 disposed in a second column from the left and right edges 120b of the reflective sheet 120, and around a third through hole 123 disposed in a third column from the left and right edges 120b of the reflective sheet 120.

In the light conversion region 410, a density of points including the light conversion material may be constant.

Figure 21:
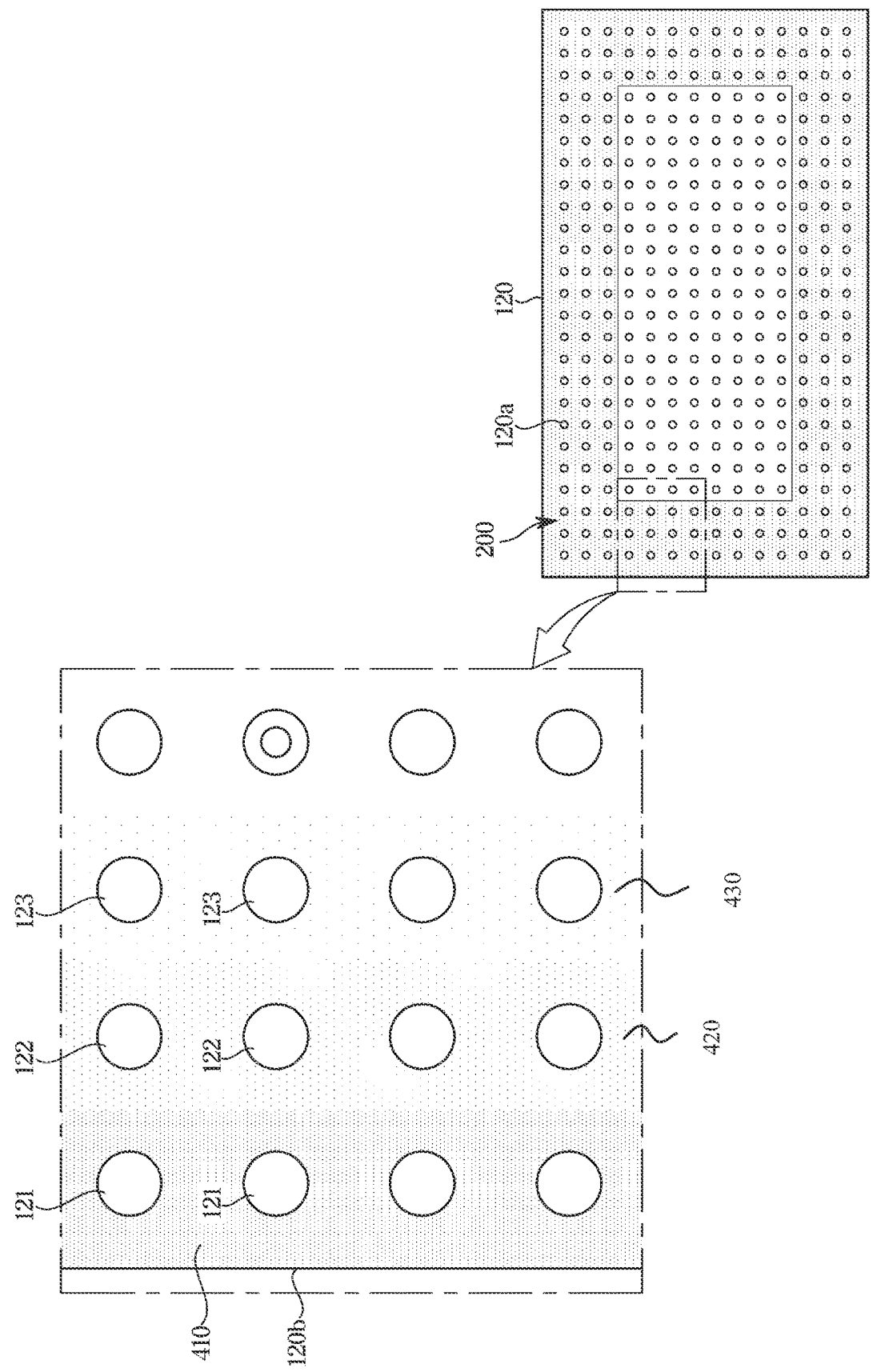
FIG. 21 is a view of an example of the light conversion patch arranged on the left and right edge portions of the light source apparatus according to an exemplary embodiment of the present disclosure.

FIG. 21 is a view of an example of the light conversion patch arranged on the left and right edge portions of the light source apparatus according to an exemplary embodiment of the present disclosure.

As illustrated in FIG. 21, a light conversion patch 200 including a light conversion material may be arranged around through holes 120a at the edge portion of the reflective sheet 120.

The light conversion patch 200 may include a light conversion region 420, in which a light conversion material is dispersed, surrounding the through holes 120a. For example, the light conversion region 420, in which points including the light conversion material are distributed, may be arranged around the through holes 120a.

The light conversion region 410 may be arranged around a first through hole 121, a second through hole 122, and a third through hole 123.

In the light conversion region 410, a density of points including the light conversion material may vary according to a distance from the left and right edges 120b of the reflective sheet 120. For example, as the distance from the left and right edges 120b of the reflective sheet 120 is increased, the density of points including the light conversion material may be reduced.

In the above description, it has been described that the light conversion patch 200 is applied, printed or coated on the edge portion of the "reflective sheet 120". However, the light conversion patch 200 may be applied, printed or coated on not only the "reflective sheet 120" but also other sheets or plates.

Figure 22:
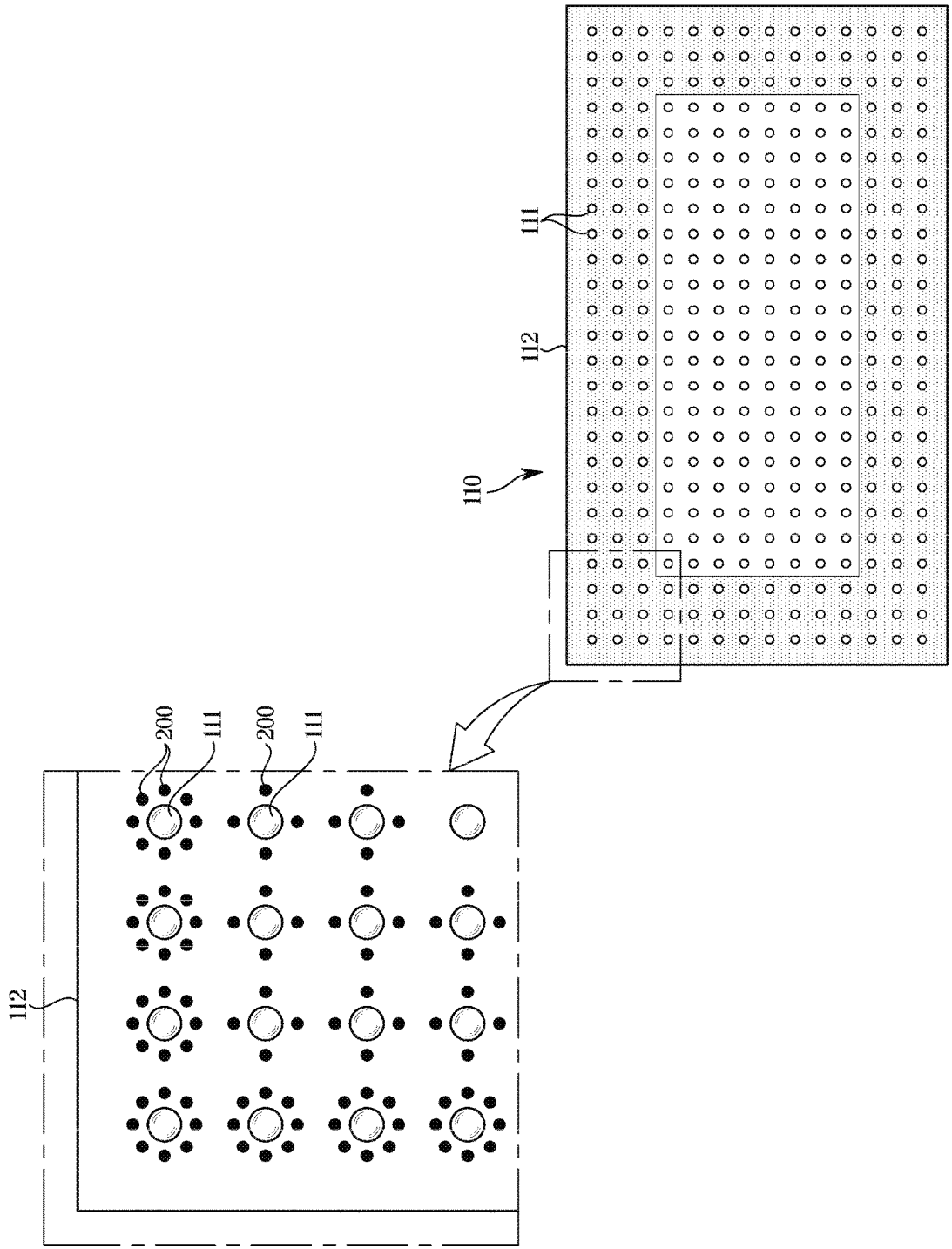
FIG. 22 is a view of an example of the light conversion patch arranged on the edge portion of the light source apparatus according to an exemplary embodiment of the present disclosure.

FIG. 22 is a view of an example of the light conversion patch arranged on the edge portion of the light source apparatus according to an exemplary embodiment of the present disclosure.

For example, a light conversion patch 200 may be applied, printed or coated on the edge portion of the substrate 112. The light conversion patch 200 may include a plurality of light conversion patches arranged at approximately equal intervals along a circumference of a circle surrounding the light source 111 as shown in FIG. 22.

The light conversion patches surrounding the light source 111 may be exposed through the through hole 120a of the reflective sheet 120. Accordingly, light emitted from the light source 111 may be reflected from the light conversion patch 200 coated, printed or coated on the substrate 112.

The arrangement of the light conversion patch 200 is not limited to FIG. 22, and the light conversion patch 200 may be arranged along the circumference of the light source 111 on the substrate 112 as shown in FIGS. 10 to 21.

In addition, the light conversion patch 200 is not limited to being arranged on the reflective sheet 120 or the substrate 112, and thus the light conversion patch 200 may be applied, printed, or coated on the edge portion of the diffuser plate 130, the diffusion sheet 142, the prism sheet 143, the light conversion sheet 141 or the reflective polarizing sheet 144.

The display apparatus according to an exemplary embodiment may include the liquid crystal panel and the light source apparatus configured to irradiate light to the liquid crystal panel. The light source apparatus may include the plurality of light sources configured to emit blue light, and the reflective sheet in which a plurality of holes, through which each of the plurality of light sources is passed, is formed. The plurality of holes may include a first hole disposed at an edge portion of the reflective sheet, and a second hole in which a distance from the edge of the reflective sheet is greater than a distance between the edge of the reflective sheet and the first hole. The light source apparatus may further include the plurality of first light conversion patches arranged along a circumference of a circle surrounding the first hole on the reflective sheet, and the plurality of second light conversion patches arranged along a circumference of a circle surrounding the second hole on the reflective sheet. The size of each of the plurality of first light conversion patches may be greater than the size of each of the plurality of second light conversion patches, and each of the plurality of first and second light conversion patches may include at least one of a yellow fluorescent material, a yellow dye, or a yellow pigment.

Accordingly, the ratio of blue light contained in the light may be reduced, and the ratio of yellow light may be further increased at the edge portion of the light source apparatus. Further, a difficulty, in which the edge portion of the light source apparatus is more bluish than the central portion of the light source apparatus, that is, the optical defect may be eliminated.

The number of the plurality of first light conversion patches surrounding any one first hole among the plurality of first holes may be greater than the number of the plurality of second light conversion patches surrounding any one second hole among the plurality of second holes. An angular interval between the plurality of first light conversion patches surrounding any one first hole among the plurality of first holes may be less than an angular interval between the plurality of second light conversion patches surrounding any one second hole among the plurality of second holes.

Accordingly, at the edge portion of the light source apparatus, the ratio of blue light may be reduced in steps and the ratio of yellow light may be increased in steps. Further, it is possible to maintain uniformity of color between the edge portion of the light source apparatus and the central portion of the light source apparatus.

The number of the plurality of first light conversion patches surrounding any one first hole among the plurality of first holes may be equal to the number of the plurality of second light conversion patches surrounding any one second hole among the plurality of second holes. The angular interval between the plurality of first light conversion patches surrounding any one first hole among the plurality of first holes may be equal to an angular interval between the plurality of second light conversion patches surrounding any one second hole among the plurality of second holes.

Accordingly, the defect (e.g., optical defect), in which the edge portion of the light source apparatus is more bluish than the central portion of the light source apparatus may be eliminated by using the simple structure described herein.

The diameter of each of the plurality of light sources may be between approximately 2.0 millimeters (mm) and 3.0 mm.

The diameter of each of the plurality of holes may be between approximately 3.5 mm and 5.5 mm.

The distance between the plurality of holes may be between approximately 8.5 mm and 13.5 mm.

Each of the plurality of first light conversion patches may be circular or polygonal, and the dimension (e.g. diameter or length) of each of the plurality of first light conversion patches may be between approximately 1.0 mm and 2.0 mm.

The plurality of first light conversion patches may include eight light conversion patches surrounding any one first hole among the plurality of first holes.

Each of the plurality of second light conversion patches may be circular or polygonal, and a dimension (e.g. diameter or length) of each of the plurality of second light conversion patches may be between approximately 0.8 mm and 1.5 mm.

The plurality of second light conversion patches may include four light conversion patches surrounding any one second hole among the plurality of second holes.

The plurality of holes may include the third hole in which the distance from the corner of the reflective sheet is a minimum. The light source apparatus may further include the plurality of third light conversion patches arranged along a circumference of a circle surrounding the third hole on the reflective sheet, and the size of each of the plurality of third light conversion patches may be greater than the size of each of the plurality of second light conversion patches.

Accordingly, at the corner portion of the light source apparatus, the ratio of blue light may be reduced and the ratio of yellow light may be further increased. Further, the defect (e.g., optical defect), in which the corner portion of the light source apparatus is more bluish than the central portion of the light source apparatus may be eliminated.

Each of the plurality of third light conversion patches may be circular or polygonal, and a dimension (e.g. diameter or length) of each of the plurality of third light conversion patches may be between approximately 1.5 mm and 2.5 mm.

The plurality of third light conversion patches may include eight light conversion patches surrounding any one third hole among the plurality of third holes.

The plurality of first light conversion patches may include a plurality of different first rings surrounding the first hole, and the plurality of second light conversion patches may include a plurality of different second rings surrounding the first hole. The number of the first rings may be greater than the number of the second rings.

The plurality of first light conversion patches may include a first ring surrounding the first hole and the plurality of second light conversion patches may include a second ring surrounding the first hole. The width of the first ring may be greater than the width of the second ring.

The light source apparatus may further include the light conversion sheet provided to convert a portion of the blue light included in incident light into yellow light and provided to transmit another portion of the blue light.

Each of the plurality of first light conversion patches may convert a portion of the blue light included in incident light into yellow light and transmit another portion of the blue light.

Each of the plurality of first light conversion patches may absorb a portion of the blue light included in incident light and reflect the yellow light included in the incident light.

The display apparatus according to an exemplary embodiment may include the liquid crystal panel, and the light source apparatus configured to irradiate light to the liquid crystal panel. The light source apparatus may include the plurality of light sources configured to emit blue light and the reflective sheet in which the plurality of holes, through which each of the plurality of light sources is passed, is formed. The plurality of holes may include a first hole disposed at an edge portion of the reflective sheet, and a second hole farther away from the edge of the reflective sheet in comparison with the first hole. The light source apparatus may further include the first light conversion patches arranged around the first hole on the reflective sheet, and the second light conversion patches arranged around the second hole on the reflective sheet. An area density of the first light conversion patches may be greater than an area density of the second light conversion patches.

The disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

A storage medium readable by machine may be provided in the form of a non-transitory storage medium. Here "non-transitory storage medium" means that the storage medium is a tangible device and does not contain a signal (for example, electromagnetic wave), and this term does not distinguish the case in which data is semi-permanently stored in the storage medium, from the case in which data is temporarily stored. For example, a non-temporary transitory storage medium may include a buffer in which data is temporarily stored.

According to an exemplary embodiment, the method according to various embodiments disclosed herein may be provided by being included in a computer program product. Computer program products may be traded between sellers and buyers as commodities. Computer program products may be distributed in the form of a storage medium (for example, compact disc read only memory (CD-ROM)), readable by a device. Alternatively, computer program products may be distributed (for example, downloaded or uploaded) online through an application store (for example, Play Store™) or directly distributed between two user devices (for example, smart phones). In the case of online distribution, at least a portion of the computer program product (for example, downloadable app) may be temporarily stored or created temporarily in a storage medium readable by a device, such as the manufacturer's server, the application store's server, or the relay server's memory.

While the present disclosure has been particularly described with reference to exemplary embodiments, it should be understood by those of skilled in the art that various changes in form and details may be made without departing from the spirit and scope of the present disclosure.

What is claimed is:

1. A display device comprising:
   a liquid crystal panel;
   a plurality of light sources configured to emit blue light;
   a reflective sheet comprising four edge portions and a center portion, wherein a plurality of holes are disposed on the reflective sheet, the plurality of holes comprises a first hole and a second hole on each of the four edge portions of the reflective sheet, each of the four edge portions comprises an edge of the reflective sheet, the first hole is disposed at a first distance from the edge of the reflective sheet, and the second hole is disposed at a second distance from the edge of the reflective sheet, wherein the second distance is greater than the first distance; and
   a plurality of light conversion dots comprising a plurality of first light conversion dots and a plurality of second light conversion dots, wherein the plurality of first light conversion dots are disposed around the first hole of the reflective sheet, and the plurality of second light conversion dots are disposed around the second hole of the reflective sheet,
   wherein a size of each of the plurality of first light conversion dots is greater than a size of each of the plurality of second light conversion dots, and wherein the plurality of holes further comprises other holes disposed on the center portion, no light conversion dot is disposed around each of the other holes.

2. The display device according to claim 1, wherein the plurality of first light conversion dots comprises eight first light conversion dots disposed around the first hole, and
the plurality of second light conversion dots comprises eight second light conversion dots disposed around the second hole.

3. The display device according to claim 1, wherein the plurality of first light conversion dots are arranged at equal angular intervals around the first hole, and
the plurality of second light conversion dots are arranged at equal angular intervals around the second hole.

4. The display device according to claim 1, wherein the plurality of first light conversion dots are arranged at intervals on a circumference of a first virtual circle surrounding the first hole, and
the plurality of second light conversion dots are arranged at intervals on a circumference of a second virtual circle surrounding the second hole.

5. The display device according to claim 1, wherein each of the plurality of first light conversion dots and the plurality of second light conversion dots is a dot that is circular.

6. The display device according to claim 1, wherein a diameter of each of the plurality of first light conversion dots is equal to or greater than 1.04 mm, and is equal to or less than 1.56 mm, and
a diameter of each of the plurality of second light conversion dots is equal to or greater than 0.88 mm, and is equal to or less than 1.32 mm.

7. The display device according to claim 1, wherein each of the plurality of light conversion dots comprise at least one of a fluorescent material, a dye, or a pigment.

8. The display device according to claim 7, wherein each of the plurality of light conversion dots is configured to convert the blue light into light of a color different from blue.

9. The display device according to claim 1, wherein each of the plurality of light conversion dots is applied, printed, or coated on the reflective sheet.

10. The display device according to claim 1, wherein each of the plurality of light conversion dots comprises at least one of a yellow fluorescent material, a yellow dye, or a yellow pigment.

11. The display device according to claim 10, wherein each of the plurality of light conversion dots is configured to convert the blue light into yellow light.

12. The display device according to claim 1, wherein the plurality of holes further comprises a third hole disposed on each of the four edge portions of the reflective sheet,
the third hole is disposed at a third distance from the edge of the reflective sheet, and the third distance is greater than the first distance and the second distance, and
the plurality of light conversion dots further comprises a plurality of third light conversion dots disposed around the third hole of the reflective sheet.

13. The display device according to claim 12, wherein the plurality of third light conversion dots comprises eight third light conversion dots disposed around the third hole.

14. The display device according to claim 12, wherein the plurality of third light conversion dots are arranged at equal angular intervals around the third hole.

15. The display device according to claim 12, wherein a diameter of each of the plurality of third light conversion dots is equal to or greater than 0.72 mm and is equal to or less than 1.08 mm.

16. The display device according to claim 1, wherein a diameter of the first hole and the second hole is equal to or greater than 3.6 mm and equal to or less than 5.4 mm, and
a distance between a center of the first hole and a center of the second hole is equal to or greater than 8.5 mm and equal to or less than 13.5 mm.

17. The display device according to claim 1, wherein each of the plurality of light sources comprises a light emitting diode disposed on a board in a Chip On Board (COB) method and an optical dome whose vertical cross section being a bow shape or a semicircle shape.

18. The display device according to claim 17, wherein an intensity of a first light beam which is emitted from the light emitting diode in a first direction perpendicular to the board is less than an intensity of a second light beam which is emitted from the light emitting diode in a second direction different from the first direction.

19. The display device according to claim 1, wherein
the plurality of first light conversion dots are closer to the first hole than all other holes of the plurality of holes, and
the plurality of second light conversion dots are closer to the second hole than all other holes of the plurality of holes.

20. A light apparatus for a display device, the light apparatus comprising:
a reflective sheet comprising four edge portions and a center portion, wherein a plurality of holes are disposed on the reflective sheet, the plurality of holes comprises a first hole and a second hole on each of the four edge portions of the reflective sheet, each of the four edge portions comprises an edge of the reflective sheet, the first hole is disposed at a first distance from the edge of the reflective sheet, and the second hole is disposed at a second distance from the edge of the reflective sheet, wherein the second distance is greater than the first distance; and
a plurality of light conversion dots comprising a plurality of first light conversion dots and a plurality of second light conversion dots,
wherein the plurality of first light conversion dots are disposed around the first hole of the reflective sheet, and the plurality of second light conversion dots are disposed around the second hole of the reflective sheet,
wherein a size of each of the plurality of first light conversion dots is greater than a size of each of the plurality of second light conversion dots, and
wherein the plurality of holes further comprises other holes disposed on the center portion, no light conversion dot is disposed around each of the other holes.

* * * * *